United States Patent
Ohzeki et al.

[19]

[11] Patent Number: 5,311,268
[45] Date of Patent: May 10, 1994

[54] FIXING DEVICE USING FUZZY INFERENCE

[75] Inventors: Yukihiro Ohzeki; Katsuhiro Sakaizawa, both of Tokyo, Japan

[73] Assignee: Canon Kabushiki Kaisha, Tokyo, Japan

[21] Appl. No.: 63,079

[22] Filed: May 18, 1993

[51] Int. Cl.⁵ .................... G03G 15/20; G03G 21/00
[52] U.S. Cl. .................... 355/285; 355/204; 355/208; 355/282; 219/216; 219/497; 395/900
[58] Field of Search ............ 355/200, 204, 208, 285, 355/273, 282; 219/497, 216; 395/900

[56] References Cited

U.S. PATENT DOCUMENTS

| | | | |
|---|---|---|---|
| 5,029,314 | 7/1991 | Katsumi et al. | 355/208 |
| 5,109,275 | 4/1992 | Naka et al. | 355/326 X |
| 5,173,224 | 12/1992 | Nakamura et al. | 395/900 X |
| 5,220,389 | 6/1993 | Kishimoto et al. | 355/285 |
| 5,231,452 | 7/1993 | Murayama et al. | 355/208 |

FOREIGN PATENT DOCUMENTS

| | | |
|---|---|---|
| 0010265 | 1/1991 | Japan . |
| 0178678 | 6/1992 | Japan . |
| 0204761 | 7/1992 | Japan . |
| 0291274 | 10/1992 | Japan . |
| 0303875 | 10/1992 | Japan . |

*Primary Examiner*—Matthew S. Smith
*Attorney, Agent, or Firm*—Fitzpatrick, Cella, Harper & Scinto

[57] ABSTRACT

Disclosed is a fixing device using fuzzy inference, which is used for copying machine, optical printer, or the like. The fixing device is provided with a fixing heater drive circuit 13 for controlling a heater 8 arranged in a fixing roller 9 on the basis of signals from CPU 1. The CPU 1 executes fuzzy inference so as to maintain the heat amount within predetermined value.

9 Claims, 42 Drawing Sheets

DEVIATION OF THERMISTOR OUTPUT VALUE AT ROOM TEMPERATURE (RT)

THERMISTOR OUTPUT VALUE GRADIENT (DRT)

THERMISTOR OUTPUT VALUE (S)

DEVIATION OF HALOGEN HEATER ENERGIZING TIME (HT)

FIG. 3

TABLE 1

| RULE 1  | IF RT is NB and DRT is NB and S is NB THEN HT is PB |
|---------|------------------------------------------------------|
| RULE 2  | IF RT is NB and DRT is NS and S is NB THEN HT is PB |
| RULE 3  | IF RT is NB and DRT is ZO and S is NB THEN HT is PB |
| RULE 4  | IF RT is NB and DRT is PS and S is NB THEN HT is PB |
| RULE 5  | IF RT is NB and DRT is PB and S is NB THEN HT is PB |
| RULE 6  | IF RT is NS and DRT is NB and S is NB THEN HT is PB |
| RULE 7  | IF RT is NS and DRT is NS and S is NB THEN HT is PB |
| RULE 8  | IF RT is NS and DRT is ZO and S is NB THEN HT is PB |
| RULE 9  | IF RT is NS and DRT is PS and S is NB THEN HT is PS |
| RULE 10 | IF RT is NS and DRT is PB and S is NB THEN HT is PS |
| RULE 11 | IF RT is ZO and DRT is NB and S is NB THEN HT is PS |
| RULE 12 | IF RT is ZO and DRT is NS and S is NB THEN HT is PS |
| RULE 13 | IF RT is ZO and DRT is ZO and S is NB THEN HT is ZO |
| RULE 14 | IF RT is ZO and DRT is PS and S is NB THEN HT is ZO |
| RULE 15 | IF RT is ZO and DRT is PB and S is NB THEN HT is ZO |
| RULE 16 | IF RT is PS and DRT is NB and S is NB THEN HT is PS |
| RULE 17 | IF RT is PS and DRT is NS and S is NB THEN HT is PS |
| RULE 18 | IF RT is PS and DRT is ZO and S is NB THEN HT is ZO |
| RULE 19 | IF RT is PS and DRT is PS and S is NB THEN HT is ZO |
| RULE 20 | IF RT is PS and DRT is PB and S is NB THEN HT is ZO |
| RULE 21 | IF RT is PB and DRT is NB and S is NB THEN HT is PS |
| RULE 22 | IF RT is PB and DRT is NS and S is NB THEN HT is PS |
| RULE 23 | IF RT is PB and DRT is ZO and S is NB THEN HT is ZO |
| RULE 24 | IF RT is PB and DRT is PS and S is NB THEN HT is ZO |
| RULE 25 | IF RT is PB and DRT is PB and S is NB THEN HT is ZO |
| RULE 26 | IF RT is PB and DRT is NB and S is ZO THEN HT is PB |
| RULE 27 | IF RT is PB and DRT is NS and S is ZO THEN HT is PS |
| RULE 28 | IF RT is PB and DRT is ZO and S is ZO THEN HT is NS |
| RULE 29 | IF RT is PB and DRT is PS and S is ZO THEN HT is NS |
| RULE 30 | IF RT is PB and DRT is PB and S is ZO THEN HT is NS |
| RULE 31 | IF RT is PB and DRT is NB and S is PB THEN HT is PS |
| RULE 32 | IF RT is PB and DRT is NS and S is PB THEN HT is PS |
| RULE 33 | IF RT is PB and DRT is ZO and S is PB THEN HT is NB |
| RULE 34 | IF RT is PB and DRT is PS and S is PB THEN HT is NB |
| RULE 35 | IF RT is PB and DRT is PB and S is PB THEN HT is NB |

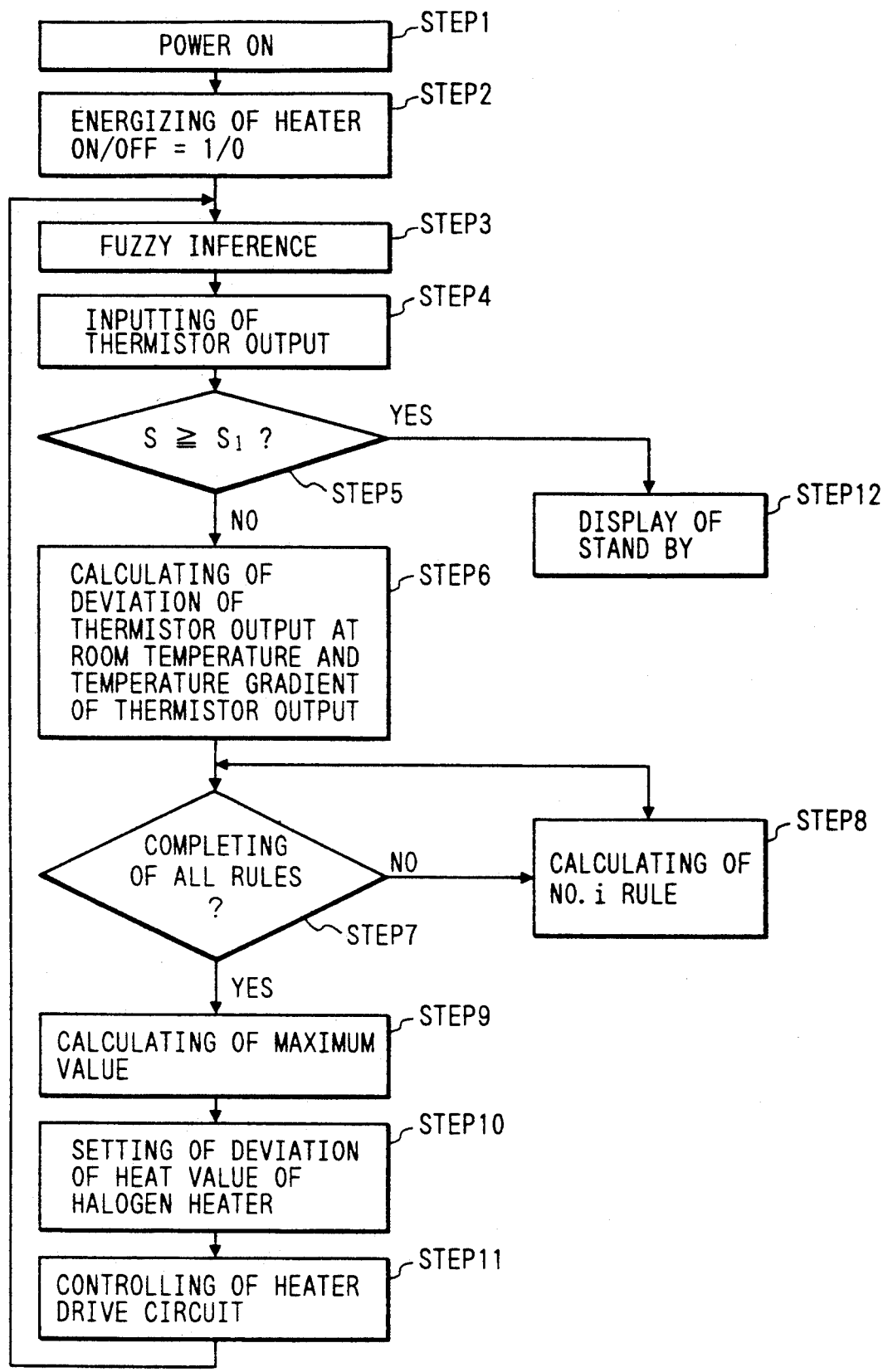

FIG. 8

TABLE 2

| TIME | RT | DRT | S | HT | WATT OF HALOGEN HEATER |
|---|---|---|---|---|---|
| START | 0 | — | — | 100% | 665W |
| 5 | 11.5 | 2.3 | 34.5 | 46 | 306 |
| 10 | 16.5 | 0.6 | 39.5 | 80 | 532 |
| 15 | 24 | 1.5 | 47 | 62.5 | 416 |
| 20 | 28.5 | 0.9 | 51.5 | 85 | 565 |
| 25 | 37 | 1.7 | 60 | 60 | 399 |
| 30 | 41.5 | 0.9 | 64.5 | 85 | 565 |
| 35 | 50 | 1.7 | 73 | 60 | 399 |
| 40 | 54.5 | 0.9 | 77.5 | 85 | 565 |
| 45 | 63 | 1.7 | 86 | 60 | 399 |
| 50 | 67.5 | 0.9 | 90.5 | 85 | 565 |
| 55 | 76 | 1.7 | 99 | 60 | 399 |
| 60 | 80.5 | 0.9 | 103.5 | 80 | 532 |
| 65 | 88 | 1.5 | 111 | 62.5 | 416 |
| 70 | 75 | 0.9 | 115.5 | 80 | 532 |
| 75 | 82.5 | 1.5 | 123 | 62.5 | 416 |
| 80 | 87 | 0.9 | 127.5 | 62.5 | 416 |
| 85 | 91.5 | 0.9 | 132 | 62.5 | 416 |
| 90 | 96 | 0.9 | 136.5 | 62.5 | 416 |
| 95 | 100.5 | 0.9 | 141 | 62.5 | 416 |
| 100 | 106 | 0.9 | 145.5 | 62.5 | 416 |
| 105 | 110.5 | 0.9 | 150 | 62.5 | 416 |
| 110 | 115 | 0.9 | 154.5 | 62.5 | 416 |
| 115 | 119.5 | 0.9 | 159 | 62.5 | 416 |
| 120 | 110 | 0.9 | 163.5 ⇨ STAND BY STATE | | |

FIG. 11

TABLE 3

| TIME | RT | DRT | S | HT | WATT OF HALOGEN HEATER |
|---|---|---|---|---|---|
| START | 0 | — | — | 100% | 825W |
| 5sec | 18.5 | 3.7 | 41.5 | 28 | 231 |
| 10 | 20.5 | 0.4 | 43.5 | 77 | 635 |
| 15 | 31.5 | 2.2 | 54.5 | 37.5 | 309 |
| 20 | 36 | 0.9 | 59 | 85 | 701 |
| 25 | 49 | 2.6 | 72 | 37.5 | 309 |
| 30 | 53.5 | 0.9 | 76.5 | 85 | 701 |
| 35 | 66.5 | 2.6 | 89.5 | 37.5 | 309 |
| 40 | 71 | 0.9 | 94 | 85 | 701 |
| 45 | 84 | 2.6 | 107 | 30 | 248 |
| 50 | 86 | 0.4 | 109 | 77 | 635 |
| 55 | 97 | 2.2 | 120 | 30 | 248 |
| 60 | 99 | 0.4 | 122 | 77 | 635 |
| 65 | 110 | 2.2 | 133 | 20 | 165 |
| 70 | 111.25 | 0.25 | 134.25 | 62.5 | 516 |
| 75 | 118.5 | 1.45 | 141.5 | 62.5 | 516 |
| 80 | 126 | 1.45 | 149 | 62.5 | 516 |
| 85 | 133.5 | 1.45 | 156.5 | 62.5 | 516 |
| 90 | 141 | 1.45 | 164 | ⇒ STAND BY STATE | |

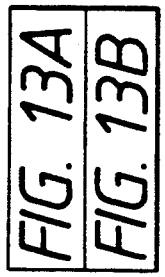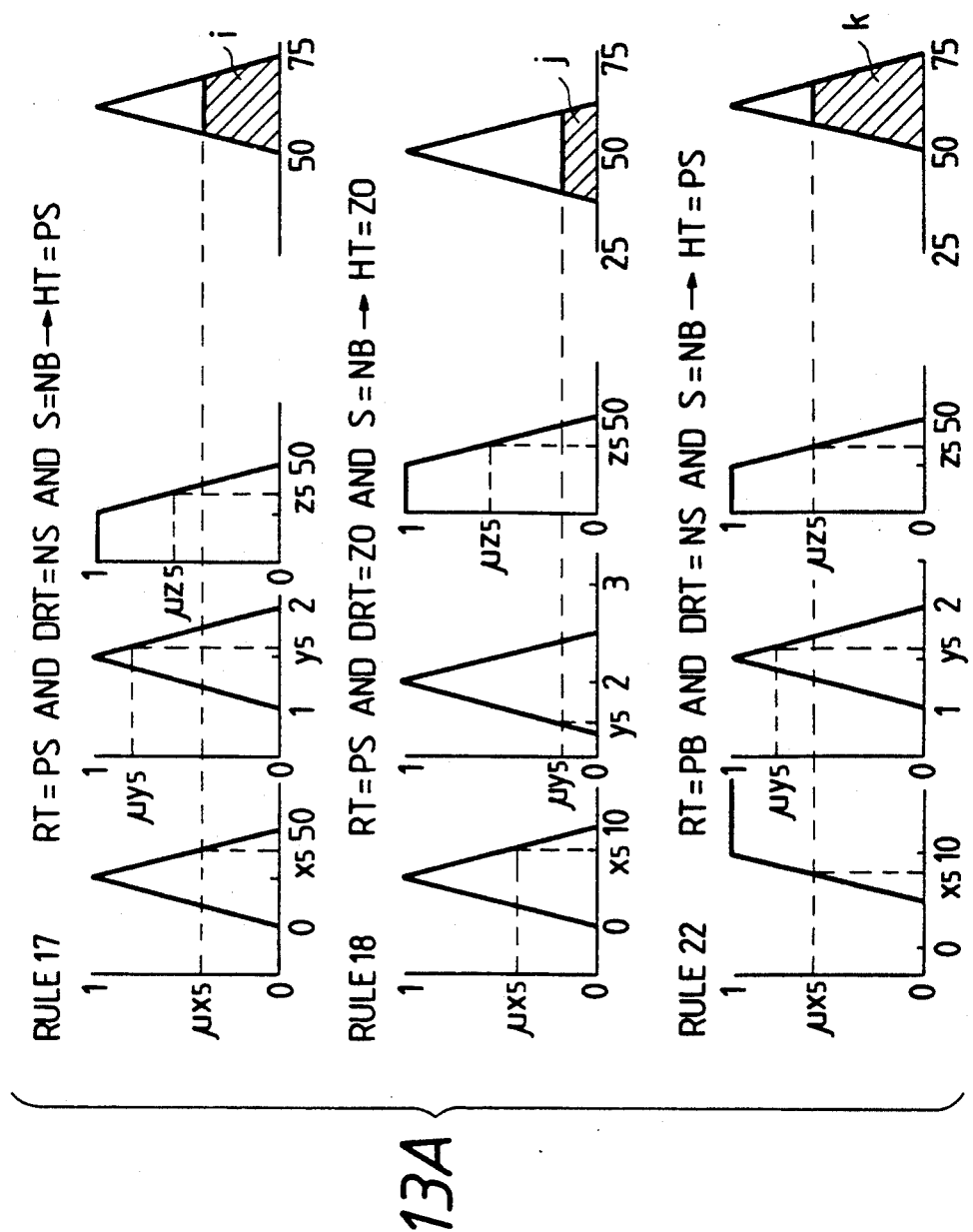

FIG. 14

TABLE 4

| TIME | RT | DRT | S | HT | WATT OF HALOGEN HEATER |
|------|------|------|--------|------|------|
| START | 0 | — | — | 100% | 518W |
| 5 | 8.0 | 1.6 | 31.0 | 56 | 290 |
| 10 | 10.5 | 0.5 | 33.5 | 70 | 363 |
| 15 | 14.25 | 0.75 | 37.25 | 77 | 399 |
| 20 | 18.25 | 0.8 | 41.25 | 77 | 399 |
| 25 | 22.25 | 0.8 | 45.25 | 80 | 414 |
| 30 | 27 | 0.95 | 50 | 85 | 440 |
| 35 | 32 | 1.0 | 55 | 85 | 440 |
| 40 | 37 | 1.0 | 60 | 85 | 440 |
| 45 | 42 | 1.0 | 65 | 85 | 440 |
| 50 | 47 | 1.0 | 70 | 85 | 440 |
| 55 | 52 | 1.0 | 75 | 85 | 440 |
| 60 | 57 | 1.0 | 80 | 85 | 440 |
| 65 | 62 | 1.0 | 85 | 85 | 440 |
| 70 | 67 | 1.0 | 90 | 85 | 440 |
| 75 | 72 | 1.0 | 95 | 85 | 440 |
| 80 | 77 | 1.0 | 100 | 85 | 440 |
| 85 | 82 | 1.0 | 105 | 85 | 440 |
| 90 | 87 | 1.0 | 110 | 80 | 414 |
| 95 | 91.75 | 0.95 | 114.75 | 77 | 399 |
| 100 | 95.75 | 0.8 | 118.75 | 70 | 363 |
| 105 | 99.5 | 0.75 | 122.5 | 65 | 337 |
| 110 | 103 | 0.7 | 126 | 62.5 | 324 |
| 115 | 106 | 0.6 | 129 | 62.5 | 324 |
| 120 | 109 | 0.6 | 132 | 62.5 | 324 |
| 125 | 112 | 0.6 | 135 | 62.5 | 324 |
| 130 | 115 | 0.6 | 138 | 62.5 | 324 |
| 135 | 118 | 0.6 | 141 | 62.5 | 324 |
| 140 | 121.5 | 0.6 | 144 | 62.5 | 324 |
| 145 | 124 | 0.6 | 147 | 62.5 | 324 |
| 150 | 127 | 0.6 | 150 | 62.5 | 324 |
| 155 | 130 | 0.6 | 153 | 62.5 | 324 |
| 160 | 133 | 0.6 | 156 | 62.5 | 324 |
| 165 | 136 | 0.6 | 159 | 62.5 | 324 |
| 170 | 139 | 0.6 | 162 | ⇒ STAND BY STATE | |

FIG. 16

| | 85V INPUT | | 100V INPUT | | 115V INPUT | |
|---|---|---|---|---|---|---|
| | AVERAGE WATT OF HALOGEN HEATER | AVERAGE ELEVATING RATE OF SURFACE TEMPERATURE ON FIXING ROLLER | AVERAGE WATT OF HALOGEN HEATER | AVERAGE ELEVATING RATE OF SURFACE TEMPERATURE ON FIXING ROLLER | AVERAGE WATT OF HALOGEN HEATER | AVERAGE ELEVATING RATE OF SURFACE TEMPERATURE ON FIXING ROLLER |
| CONVENTIONAL EXAMPLE | 518W | 1.6 deg/sec | 665W | 2.3 deg/sec | 825W | 3.7 deg/sec |
| EXAMPLE OF INVENTION | 384W | 0.8 deg/sec | 446W | 1.1 deg/sec | 484W | 1.5 deg/sec |

FIG. 19

| RULE 1 | IF VT is NB and DRT is NB and S is NB THEN HT is PB |
|---|---|
| RULE 2 | IF VT is NB and DRT is NS and S is NB THEN HT is PB |
| RULE 3 | IF VT is NB and DRT is ZO and S is NB THEN HT is PB |
| RULE 4 | IF VT is NB and DRT is PS and S is NB THEN HT is PB |
| RULE 5 | IF VT is NB and DRT is PB and S is NB THEN HT is PB |
| RULE 6 | IF VT is NS and DRT is NB and S is NB THEN HT is PB |
| RULE 7 | IF VT is NS and DRT is NS and S is NB THEN HT is PB |
| RULE 8 | IF VT is NS and DRT is ZO and S is NB THEN HT is PB |
| RULE 9 | IF VT is NS and DRT is PS and S is NB THEN HT is PB |
| RULE 10 | IF VT is NS and DRT is PB and S is NB THEN HT is PB |
| RULE 11 | IF VT is ZO and DRT is NB and S is NB THEN HT is PB |
| RULE 12 | IF VT is ZO and DRT is NS and S is NB THEN HT is PB |
| RULE 13 | IF VT is ZO and DRT is ZO and S is NB THEN HT is PB |
| RULE 14 | IF VT is ZO and DRT is PS and S is NB THEN HT is PB |
| RULE 15 | IF VT is ZO and DRT is PB and S is NB THEN HT is ZO |
| RULE 16 | IF VT is PS and DRT is NB and S is NB THEN HT is PB |
| RULE 17 | IF VT is PS and DRT is NS and S is NB THEN HT is PB |
| RULE 18 | IF VT is PS and DRT is ZO and S is NB THEN HT is PB |
| RULE 19 | IF VT is PS and DRT is PS and S is NB THEN HT is PB |
| RULE 20 | IF VT is PS and DRT is PB and S is NB THEN HT is ZO |
| RULE 21 | IF VT is PB and DRT is NB and S is NB THEN HT is PB |
| RULE 22 | IF VT is PB and DRT is NS and S is NB THEN HT is PB |
| RULE 23 | IF VT is PB and DRT is ZO and S is NB THEN HT is PB |
| RULE 24 | IF VT is PB and DRT is PS and S is NB THEN HT is PB |
| RULE 25 | IF VT is PB and DRT is PB and S is NB THEN HT is ZO |
| RULE 26 | IF VT is NB and DRT is NB and S is ZO THEN HT is PB |
| RULE 27 | IF VT is NB and DRT is NS and S is ZO THEN HT is PB |
| RULE 28 | IF VT is NB and DRT is ZO and S is ZO THEN HT is PB |
| RULE 29 | IF VT is NB and DRT is PS and S is ZO THEN HT is PB |
| RULE 30 | IF VT is NB and DRT is PB and S is ZO THEN HT is PB |
| RULE 31 | IF VT is NS and DRT is NB and S is ZO THEN HT is PB |
| RULE 32 | IF VT is NS and DRT is NS and S is ZO THEN HT is PB |
| RULE 33 | IF VT is NS and DRT is ZO and S is ZO THEN HT is PB |
| RULE 34 | IF VT is NS and DRT is PS and S is ZO THEN HT is PB |
| RULE 35 | IF VT is NS and DRT is PB and S is ZO THEN HT is PB |
| RULE 36 | IF VT is ZO and DRT is NB and S is ZO THEN HT is PB |
| RULE 37 | IF VT is ZO and DRT is NS and S is ZO THEN HT is PB |
| RULE 38 | IF VT is ZO and DRT is ZO and S is ZO THEN HT is ZO |
| RULE 39 | IF VT is ZO and DRT is PS and S is ZO THEN HT is ZO |
| RULE 40 | IF VT is ZO and DRT is PB and S is ZO THEN HT is ZO |
| RULE 41 | IF VT is PS and DRT is NB and S is ZO THEN HT is PB |
| RULE 42 | IF VT is PS and DRT is NS and S is ZO THEN HT is PB |
| RULE 43 | IF VT is PS and DRT is ZO and S is ZO THEN HT is ZO |
| RULE 44 | IF VT is PS and DRT is PS and S is ZO THEN HT is ZO |
| RULE 45 | IF VT is PS and DRT is PB and S is ZO THEN HT is ZO |
| RULE 46 | IF VT is PB and DRT is NB and S is ZO THEN HT is PB |
| RULE 47 | IF VT is PB and DRT is NS and S is ZO THEN HT is PB |
| RULE 48 | IF VT is PB and DRT is ZO and S is ZO THEN HT is ZO |
| RULE 49 | IF VT is PB and DRT is PS and S is ZO THEN HT is ZO |
| RULE 50 | IF VT is PB and DRT is PB and S is ZO THEN HT is ZO |
| RULE 51 | IF VT is NB and DRT is NB and S is PB THEN HT is PB |
| RULE 52 | IF VT is NB and DRT is NS and S is PB THEN HT is ZO |
| RULE 53 | IF VT is NB and DRT is ZO and S is PB THEN HT is ZO |
| RULE 54 | IF VT is NB and DRT is PS and S is PB THEN HT is ZO |
| RULE 55 | IF VT is NB and DRT is PB and S is PB THEN HT is ZO |
| RULE 56 | IF VT is NS and DRT is NB and S is PB THEN HT is ZO |
| RULE 57 | IF VT is NS and DRT is NS and S is PB THEN HT is ZO |
| RULE 58 | IF VT is NS and DRT is ZO and S is PB THEN HT is ZO |
| RULE 59 | IF VT is NS and DRT is PS and S is PB THEN HT is ZO |
| RULE 60 | IF VT is NS and DRT is PB and S is PB THEN HT is ZO |
| RULE 61 | IF VT is ZO and DRT is NB and S is PB THEN HT is ZO |
| RULE 62 | IF VT is ZO and DRT is NS and S is PB THEN HT is ZO |
| RULE 63 | IF VT is ZO and DRT is ZO and S is PB THEN HT is NB |
| RULE 64 | IF VT is PS and DRT is NB and S is PB THEN HT is ZO |
| RULE 65 | IF VT is PS and DRT is NS and S is PB THEN HT is ZO |
| RULE 66 | IF VT is PS and DRT is ZO and S is PB THEN HT is NB |
| RULE 67 | IF VT is PS and DRT is PS and S is PB THEN HT is NB |
| RULE 68 | IF VT is PS and DRT is PB and S is PB THEN HT is NB |
| RULE 69 | IF VT is PB and DRT is NB and S is PB THEN HT is ZO |
| RULE 70 | IF VT is PB and DRT is NS and S is PB THEN HT is NB |
| RULE 71 | IF VT is PB and DRT is ZO and S is PB THEN HT is NB |
| RULE 72 | IF VT is PB and DRT is PS and S is PB THEN HT is NB |
| RULE 73 | IF VT is PB and DRT is PB and S is PB THEN HT is NB |

FIG. 23

| TIME | VT | DRT | S | HT | WATT OF HALOGEN HEATER |
|---|---|---|---|---|---|
| START | 0 | 0 | 23 | 92.5% | 612W |
| 5 | 0 | 2.0 | 33 | 75 | 499 |
| 10 | 0 | 1.4 | 40 | 92.5 | 612 |
| 15 | 0 | 2.0 | 50 | 60 | 399 |
| 20 | 0 | 0.9 | 54.5 | 92.5 | 612 |
| 25 | 0 | 2.0 | 64.5 | 60 | 399 |
| 30 | 0 | 0.9 | 69 | 92.5 | 612 |
| 35 | 0 | 2.0 | 79 | 60 | 399 |
| 40 | 0 | 0.9 | 83.5 | 92.5 | 612 |
| 45 | 0 | 2.0 | 93.5 | 60 | 399 |
| 50 | 0 | 0.9 | 98 | 92.5 | 612 |
| 55 | 0 | 2.0 | 108 | 56 | 343 |
| 60 | 0 | 0.7 | 111.5 | 64 | 426 |
| 65 | 0 | 1.0 | 116.5 | 69 | 459 |
| 70 | 0 | 0.9 | 121 | 82.5 | 549 |
| 75 | 0 | 1.6 | 129 | 64 | 426 |
| 80 | 0 | 1.0 | 134 | 63 | 419 |
| 85 | 0 | 1.0 | 139 | 63 | 419 |
| 90 | 0 | 1.0 | 144 | 63 | 419 |
| 95 | 0 | 1.0 | 149 | 63 | 419 |
| 100 | 0 | 1.0 | 149 | 63 | 419 |
| 105 | 0 | 1.0 | 154 | 63 | 419 |
| 110 | 0 | 1.0 | 159 | 63 | 419 |
| 115 | 0 | 1.0 | 164 | ⇨ STAND BY STATE | |

FIG. 25

| TIME | VT | DRT | S | HT | WATT OF HALOGEN HEATER |
|------|----|-----|---|----|------------------------|
| START | 15 | 0 | 23 | 92.5% | 763W |
| 5 | 15 | 3.1 | 38.5 | 62.25 | 514 |
| 10 | 15 | 1.5 | 46 | 90.6 | 747 |
| 15 | 15 | 3.0 | 51 | 62.25 | 514 |
| 20 | 15 | 1.5 | 58.5 | 90.6 | 747 |
| 25 | 15 | 3.0 | 73.8 | 62.25 | 514 |
| 30 | 15 | 1.5 | 81 | 90.6 | 747 |
| 35 | 15 | 3.0 | 96 | 62.25 | 514 |
| 40 | 15 | 1.5 | 103.5 | 90 | 743 |
| 45 | 15 | 2.9 | 118 | 34 | 281 |
| 50 | 15 | 0.5 | 120.5 | 34 | 281 |
| 55 | 15 | 0.5 | 123 | 62.25 | 514 |
| 60 | 15 | 1.5 | 130.5 | 21.9 | 181 |
| 65 | 15 | 0.25 | 131.75 | 62.25 | 514 |
| 70 | 15 | 1.5 | 139.25 | 21.9 | 181 |
| 75 | 15 | 0.25 | 140.5 | 62.25 | 514 |
| 80 | 15 | 1.5 | 148 | 21.9 | 181 |
| 85 | 15 | 0.25 | 149.25 | 62.25 | 514 |
| 90 | 15 | 1.5 | 156.75 | 21.9 | 181 |
| 95 | 15 | 0.25 | 158 | 62.25 | 514 |
| 100 | 15 | 1.5 | 165.5 ⇒ STAND BY STATE | | |

FIG. 27

| TIME | RT | DRT | S | HT | WATT OF HALOGEN HEATER |
|---|---|---|---|---|---|
| START | -15 | 0 | 23 | 92.5% | 479W |
| 5 | -15 | 1.3 | 29.5 | 92.5 | 479 |
| 10 | -15 | 1.3 | 36 | 92.5 | 479 |
| 15 | -15 | 1.3 | 42.5 | 92.5 | 479 |
| 20 | -15 | 1.3 | 49 | 92.5 | 479 |
| 25 | -15 | 1.3 | 55.5 | 92.5 | 479 |
| 30 | -15 | 1.3 | 62 | 92.5 | 479 |
| 35 | -15 | 1.3 | 68.5 | 92.5 | 479 |
| 40 | -15 | 1.3 | 75 | 92.5 | 479 |
| 45 | -15 | 1.3 | 81.5 | 92.5 | 479 |
| 50 | -15 | 1.3 | 88 | 92.5 | 479 |
| 55 | -15 | 1.3 | 94.5 | 92.5 | 479 |
| 60 | -15 | 1.3 | 101 | 92 | 477 |
| 65 | -15 | 1.25 | 107.25 | 84.4 | 437 |
| 70 | -15 | 1.0 | 112.25 | 92.5 | 479 |
| 75 | -15 | 1.3 | 118.75 | 69.9 | 362 |
| 80 | -15 | 0.8 | 122.75 | 92.5 | 479 |
| 85 | -15 | 1.3 | 129.25 | 63.6 | 329 |
| 90 | -15 | 0.6 | 132.25 | 92.5 | 479 |
| 95 | -15 | 1.3 | 138.75 | 63.6 | 329 |
| 100 | -15 | 0.6 | 141.75 | 92.5 | 479 |
| 105 | -15 | 1.3 | 148.25 | 63.6 | 329 |
| 110 | -15 | 0.6 | 151.25 | 92.5 | 479 |
| 115 | -15 | 1.3 | 157.75 | 63.6 | 329 |
| 120 | 139 | 0.6 | 160.75 ⇒ STAND BY STATE | | |

FIG. 28

| | 85V INPUT | | 100V INPUT | | 115V INPUT | |
|---|---|---|---|---|---|---|
| | AVERAGE WATT OF HALOGEN HEATER | AVERAGE ELEVATING RATE OF SURFACE TEMPERATURE ON FIXING ROLLER | AVERAGE WATT OF HALOGEN HEATER | AVERAGE ELEVATING RATE OF SURFACE TEMPERATURE ON FIXING ROLLER | AVERAGE WATT OF HALOGEN HEATER | AVERAGE ELEVATING RATE OF SURFACE TEMPERATURE ON FIXING ROLLER |
| CONVENTIONAL EXAMPLE | 518W | 1.6 deg/sec | 665W | 2.3 deg/sec | 825W | 3.7 deg/sec |
| EXAMPLE OF INVENTION | 447W | 1.1 deg/sec | 474W | 1.2 deg/sec | 483W | 1.4 deg/sec |

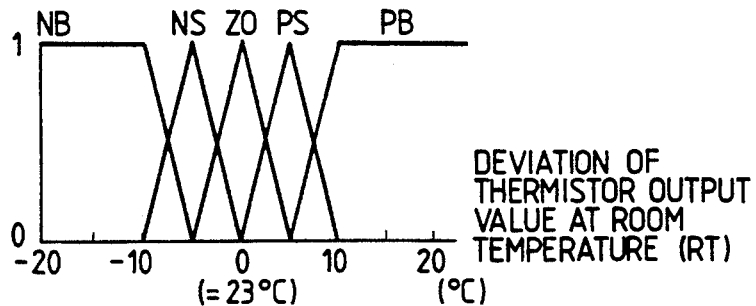
FIG. 30A  DEVIATION OF THERMISTOR OUTPUT VALUE AT ROOM TEMPERATURE (RT)
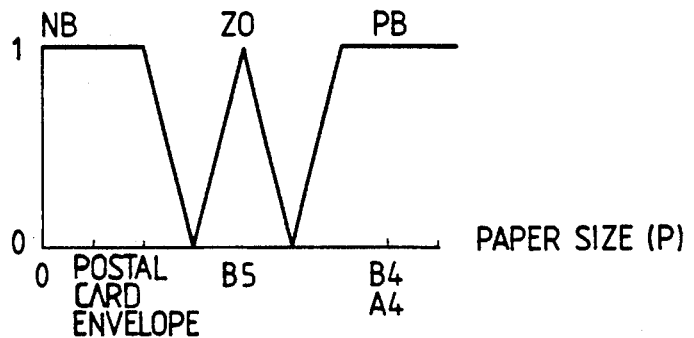
FIG. 30B  PAPER SIZE (P)
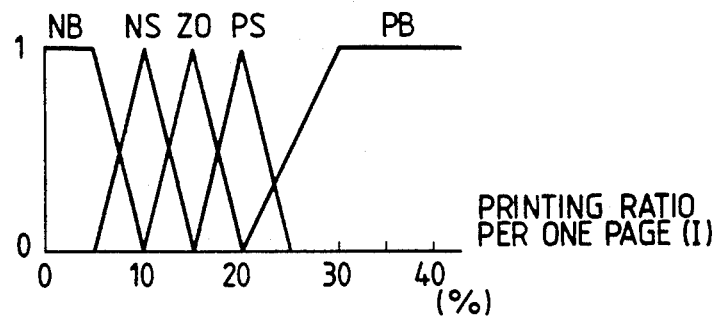
FIG. 30C  PRINTING RATIO PER ONE PAGE (I)
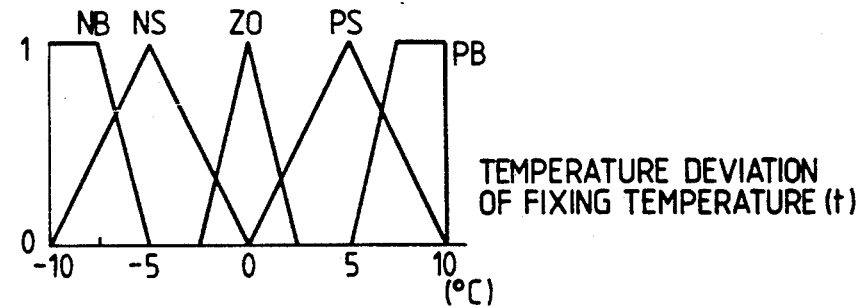
FIG. 30D  TEMPERATURE DEVIATION OF FIXING TEMPERATURE (t)

FIG. 31

| P | I | PB | PS | ZO | NS | NB |
|---|---|----|----|----|----|----|
| PB | PB | ZO | ZO | ZO | PS | PS |
|  | PS | ZO | ZO | ZO | PS | PS |
|  | ZO | ZO | NS | ZO | PS | PS |
|  | NS | NS | NS | NS | ZO | ZO |
|  | NB | NB | NS | NS | ZO | ZO |
| ZO | PB | ZO | ZO | ZO | PS | PS |
|  | PS | ZO | NS | ZO | PS | PS |
|  | ZO | NS | ZO | ZO | PS | PS |
|  | NS | NS | NS | ZO | ZO | ZO |
|  | NB | NB | NS | NS | ZO | ZO |
| NB | PB | ZO | ZO | PS | PB | PB |
|  | PS | ZO | ZO | PS | PB | PB |
|  | ZO | ZO | ZO | ZO | PS | PB |
|  | NS | ZO | ZO | ZO | PS | PS |
|  | NB | ZO | ZO | ZO | PS | PS |

| RT | PB | PS | ZO | NS | NB |

FIG. 39

| P | I \ RT | PB | PS | ZO | NS | NB |
|---|---|---|---|---|---|---|
| PB | PB | ZO | ZO | ZO | PS | PS |
|  | PS | ZO | ZO | ZO | PS | PS |
|  | ZO | ZO | NS | ZO | PS | PS |
|  | NS | NS | NS | NS | ZO | ZO |
|  | NB | NB | NB | NS | ZO | ZO |
| PS | PB | ZO | ZO | ZO | PS | PS |
|  | PS | ZO | ZO | ZO | PS | PS |
|  | ZO | ZO | NS | ZO | PS | PS |
|  | NS | NS | NS | NS | ZO | ZO |
|  | NB | NB | NB | NS | ZO | ZO |
| ZO | PB | PB | ZO | ZO | PS | PS |
|  | PS | PS | ZO | ZO | PS | PS |
|  | ZO | ZO | NS | ZO | ZO | PS |
|  | NS | NS | NS | NS | ZO | ZO |
|  | NB | NB | NB | NS | NS | ZO |
| NS | PB | PB | ZO | ZO | PS | PS |
|  | PS | PS | ZO | ZO | ZO | PS |
|  | ZO | ZO | ZO | ZO | ZO | PS |
|  | NS | NS | ZO | ZO | ZO | PS |
|  | NB | NB | ZO | ZO | ZO | PS |
| NB | PB | PB | PB | PB | PB | PB |
|  | PS | PS | PS | PS | PS | PB |
|  | ZO | ZO | ZO | ZO | PS | PB |
|  | NS | ZO | ZO | ZO | PS | PB |
|  | NB | ZO | ZO | ZO | PS | PB |

FIXING DEVICE USING FUZZY INFERENCE

BACKGROUND OF THE INVENTION

1. Field of the Invention

The present invention relates to a fixing device, which is used for image forming apparatuses such as a copying machine, an optical printer, and the like, and fixing a toner image on a recording medium by heating.

2. Related Background Art

FIG. 41 is a longitudinal sectional view of a conventional thermal fixing device In a copying apparatus, a fixing device 11 is arranged at a position to which a transfer medium J as a recording medium transferred with a toner image B is fed.

The fixing device 11 comprises a fixing roller 9. The fixing roller 9 is rotatably supported by the apparatus main body, and is rotated by a driving means (not shown) in the direction of an arrow in FIG. 41. The fixing roller 9 has a cylindrical core 9a consisting of, e.g., aluminum, iron, or the like, and the surface of the core 9a is coated with a mold-releasable resin layer 9b such as PFA, PTFE, or the like. A halogen heater (heating member) 8 is arranged in the cylindrical core 9a, and is applied with a voltage from a low voltage power source 5. On the other hand, a thermistor (temperature detection element) 7 contacts the outer circumferential surface of the fixing roller 9 so as to detect the temperature of the outer circumferential surface. The thermistor 7 is connected to a control means C. The control means C controls a ON/OFF state of the halogen heater 8 on the basis of an output signal from the thermistor 7, thereby maintaining the temperature of the outer circumferential surface of the fixing roller 9 at a predetermined value. A separation pawl 18 contacts the outer circumferential surface of the fixing roller 9 so as to prevent the transfer medium J on which the toner image B has been fixed, from being wound around the fixing roller 9.

A press roller 10 is arranged under the fixing roller 9, so that its rotational shaft extends parallel to that of the press roller 9. The fixing roller 10 has a core 10a consisting of, e.g., iron, stainless steel, or the like, and an elastic member layer 10b coated on the core 10a. The elastic member layer 10b consists of silicone rubber, fluororubber, or the like with high heat resistance and good mold release properties. The press roller 10 is arranged so that its outer circumferential surface is pressed against the fixing roller 9. The press roller 10 is driven in the direction of an arrow upon rotation of the fixing roller 9.

An entrance guide member 17 is arranged at the right side of the fixing device 11 with the above arrangement. The entrance guide member 17 feeds the transfer medium J transferred with the toner image B to a nip between the fixing roller 9 and the press roller 10. When the transfer medium J is fed from the right side of the transfer device 11, as shown in FIG. 41, and is fed to the nip between the fixing roller 9 and the press roller 10, the toner image B is fixed on the transfer medium J since it is pressed against the fixing roller 9 heated to a predetermined temperature.

Since the above-mentioned conventional control does not take a drift of an input voltage to be input to the low voltage power source 5 into consideration, when the input voltage drifts, the power in watts of the halogen heater 8 drifts accordingly. The following equation expresses the relationship between the drifted input voltage V and the power W in watts of the halogen heater 8

$$(W/W_0) = (V/V_0)^{1.54} \qquad (1)$$

$W_0$: rated power, $V_0$: rated voltage

For example, a case will be examined below wherein a convey speed (to be referred to as a "process speed" hereinafter) of the transfer medium J is 49 mm/sec, the thickness of the core 9a of the fixing roller 9 is 2.5 mm, and the thermistor 7 is brought into contact with a portion which is not in direct contact with the transfer medium J so as to detect the temperature of that portion. In this case, the power in watts of the halogen heater 8 required for attaining proper fixing is about 518 W normally (when the input voltage does not drift). However, in consideration of about ±15% (85 V to 115 V) of the drift of the input voltage, the voltage drift occurs within a range from 85 V to 115 V, and in order to guarantee fixing characteristics in this case, a halogen heater having a rated voltage of 100 V and a rated power of 665 W must be used.

As can be understood from equation (1), the power in watts of this halogen heater 8 varies within a range from 518 W to about 825 W in response to the input voltage drift. When the power in watts of the halogen heater 8 drifts largely in this manner the elevating rate of the surface temperature on the fixing roller 9 largely varies.

FIG. 42 shows the relationship between the power in watts of the halogen heater 8 and the elevating rate of the surface temperature on the fixing roller 9. As is apparent from FIG. 42, when the power in watts of the halogen heater 8 is 518 W (input voltage=85 V), the elevating rate of the surface temperature on the fixing roller 9 is 1.6 deg/sec; when the power in watts of the halogen heater 8 is 825 W (input voltage=115 V), the elevating rate of the surface temperature on the fixing roller 9 is 3.7 deg/sec, and varies twice or more the minimum value.

Such a variation in elevating rate of the surface temperature on the fixing roller 9 according to the input voltage poses a particularly serious problem depending on an environment of the apparatus.

Assume that the power switch of the copying apparatus is OFF, and a copy operation (transfer and fixing of a toner image) must be performed immediately after the power switch is turned on in a state in which the surface temperature on the fixing roller is low (in the morning or winter). In this case, when the input voltage becomes high (e.g., 115 V), the elevating rate of the surface temperature of the fixing roller 9 is large, as described above, and hence, the control may overshoot. In this state, a safety circuit (not shown) operates, and the copying apparatus may halt. On the other hand, assume that the power in watts of the halogen heater is set to guarantee fixing characteristics when the input voltage drifts to be lowered (e.g., 85 V). If the input voltage is increased, power consumption of the halogen heater is increased, and arise the above-mentioned problem and another problem associated with an increase in power source capacity in an environment of the apparatus.

In order to solve the above-mentioned problems, a method for decreasing the power in watts of the halogen heater in only a power-ON state by controlling, e.g., the phase of an AC power source voltage is available. With this method, however, since the power in watts of the halogen heater 8 is uniformly decreased independently of the magnitude of the input voltage, for example, when the input voltage drifts by −15%, the time required until the surface temperature on the fixing roller 9 reaches a predetermined value is undesirably prolonged.

For example, assuming that the power in watts of the halogen heater 8 is decreased by 50%, the power in watts of the halogen heater 8 and the elevating rate of the surface temperature on the fixing roller 9 are respectively 412.5 W and 0.9 deg/sec when the input voltage=115 V, and are respectively 332.5 W and 0.6 deg/sec when the input voltage=100 V. Thus, the times of warm-up corresponding to these cases are respectively prolonged to 152 sec and 228 sec. In the worst case (input voltage=85 V), the power in watts of the halogen heater 8 and the elevating rate of the surface temperature on the fixing roller 9 are respectively 259 W and 0.4 deg/sec, and the time of warm-up becomes 343 sec.

The fixing characteristics of the fixing device 11 change due to various other factors in addition to the above-mentioned input voltage drift.

1. Factor Associated with Quality of Transfer Medium

As the thickness of a transfer medium is increased, the heat capacity of the transfer medium is increased, and hence, considerably decreases the surface temperature on the fixing roller 9, which contacts the transfer medium. Therefore, when a thick sheet (a sheet having a large basis weight, e.g., 105 g/m² or more) is used as the transfer medium, the temperature of the fixing roller 9 must be set to be higher than that when a thin sheet (a sheet having a small basis weight, e.g., 90 g/m² or less) is used.

It is known from the experience that when a transfer medium with a roughened surface (e.g., bond paper) is used, the temperature of the fixing roller 9 must be set high.

2. Factor Associated with Printing Amount

In a thermal fixing process using, e.g., a toner, the toner is melted by heat, and is permanently fixed on a transfer medium. For this reason, a required heat value varies depending on the toner amount on the transfer medium, i.e., the printing ratio. For example, since characters and line images normally have a small printing ratio, a low fixing temperature can be set. However, for a graphic image or a solid-black image, a high fixing temperature must be set to obtain good fixing characteristics.

3. Factor Associated with the Environment of the Apparatus and Transfer Medium

The environment of the apparatus and the transfer medium largely influence fixing characteristics.

Even through good fixing characteristics can be obtained in a high-temperature environment, heat is easily deprived in a low-temperature environment, and the fixing temperature becomes lower than a setting value, thus causing a fixing error.

When a relatively high fixing temperature is set to assure good fixing characteristics even under the worst condition (low-temperature condition), a larger heat value is undesirably obtained in a high-temperature environment, and the temperature in the apparatus is undesirably increased. Furthermore, in a high-temperature environment, the transfer medium suffers from wrinkles, curl, and the like.

4. Factor Associated with Size of Transfer Medium

When a small-size transfer medium (e.g., a postal card or envelope) is fed to the fixing device 11 using an image forming apparatus which can use a transfer medium up to a size beyond a B4 size, a relatively high fixing temperature is normally selected. In the case of the small-size transfer medium, a portion of the outer circumferential surface of the fixing roller 9, where the thermistor 7 detects the temperature, does not often contact the small-size transfer medium. Therefore, although the surface temperature of the portion which does not contact the transfer medium can be properly assured, the surface temperature of a portion, which actually contacts the transfer medium is decreased since heat is absorbed by the transfer medium. In order to guarantee fixing characteristics in this case, a relatively high fixing temperature must be set.

5. Factor Associated with Operating State of Apparatus

The heat value of the press roller 10 immediately after the power switch of the apparatus is turned on is different from that obtained after some images are output. More specifically, since the temperature of the press roller 10 is low immediately after the power switch is turned on, heat of the fixing roller 9 is easily deprived by the press roller 10, and the surface temperature on the fixing roller 9 is decreased. For this reason, a proper fixing temperature cannot be assured, and a fixing error may occur.

SUMMARY OF THE INVENTION

It is an object of the present invention to provide a fixing device which can cope with a plurality of factors associated with fixing characteristics.

It is another object of the present invention to provide a fixing device which can control the duty ratio of electric power to be energized to a heating member.

It is still another object of the present invention to provide a fixing device which can control the fixing temperature of a heating member.

It is still another object of the present invention to provide a fixing device which comprises a heating member for thermally fixing an image on a recording medium, condition variable detection means for detecting condition variables, inference means for fuzzy-inferring a control variable associated with energization to the heating member on the basis of the condition variables detected by the condition variable detection means, and control means for executing control associated with energization to the heating member according to the control variable inferred by the inference means.

Other objects of the present invention will become apparent from the following description.

BRIEF DESCRIPTION OF THE DRAWINGS

FIG. 3 is a table showing fuzzy rules used in the first embodiment;

FIG. 5 is a flow chart showing fuzzy control in the first embodiment;

FIG. 8 is a table showing fuzzy control results in the first embodiment;

FIG. 11 is a table showing fuzzy control results in the first embodiment;

FIG. 14 is a table showing fuzzy control results in the first embodiment;

FIG. 16 is a table showing fuzzy control results in the first embodiment in comparison with a conventional example;

FIG. 19 is a table showing fuzzy rules used in the second embodiment;

FIG. 23 is a table showing results of fuzzy control (when input voltage=100 V) in the second embodiment;

FIG. 25 is a table showing results of fuzzy control (when input voltage=115 V) in the second embodiment;

FIG. 27 is a table showing results of fuzzy control (when input voltage=85 V) in the second embodiment;

FIG. 28 is a table showing fuzzy control results in the second embodiment in comparison with a conventional example;

FIGS. 30A, 30B, 30C, and 30D are explanatory views showing fuzzy sets of the third embodiment;

FIG. 31 is a table showing fuzzy rules used in the third embodiment;

FIG. 39 is a table showing fuzzy rules used in the fourth embodiment;

DESCRIPTION OF THE PREFERRED EMBODIMENTS

Figure 41:
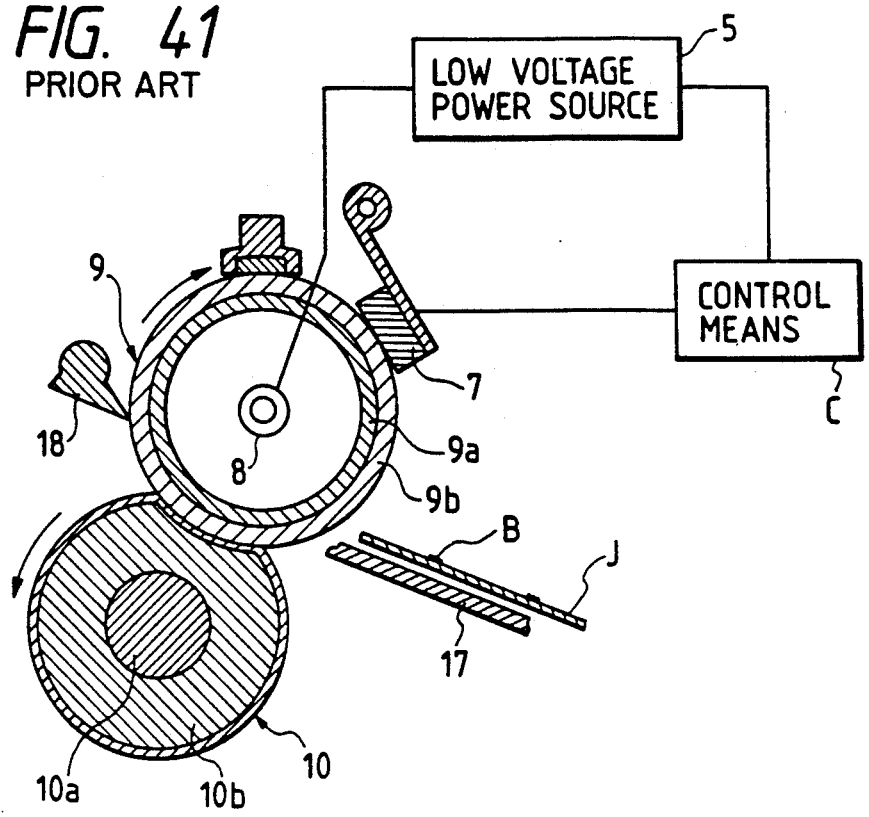
FIG. 41 is a longitudinal sectional view showing a general structure of a fixing device.

The preferred embodiments of the present invention will be described hereinafter with reference to the accompanying drawings. Note that the same reference numerals in the drawings denote the same parts as in FIG. 41, and a detailed description thereof will be omitted.

Figure 1:
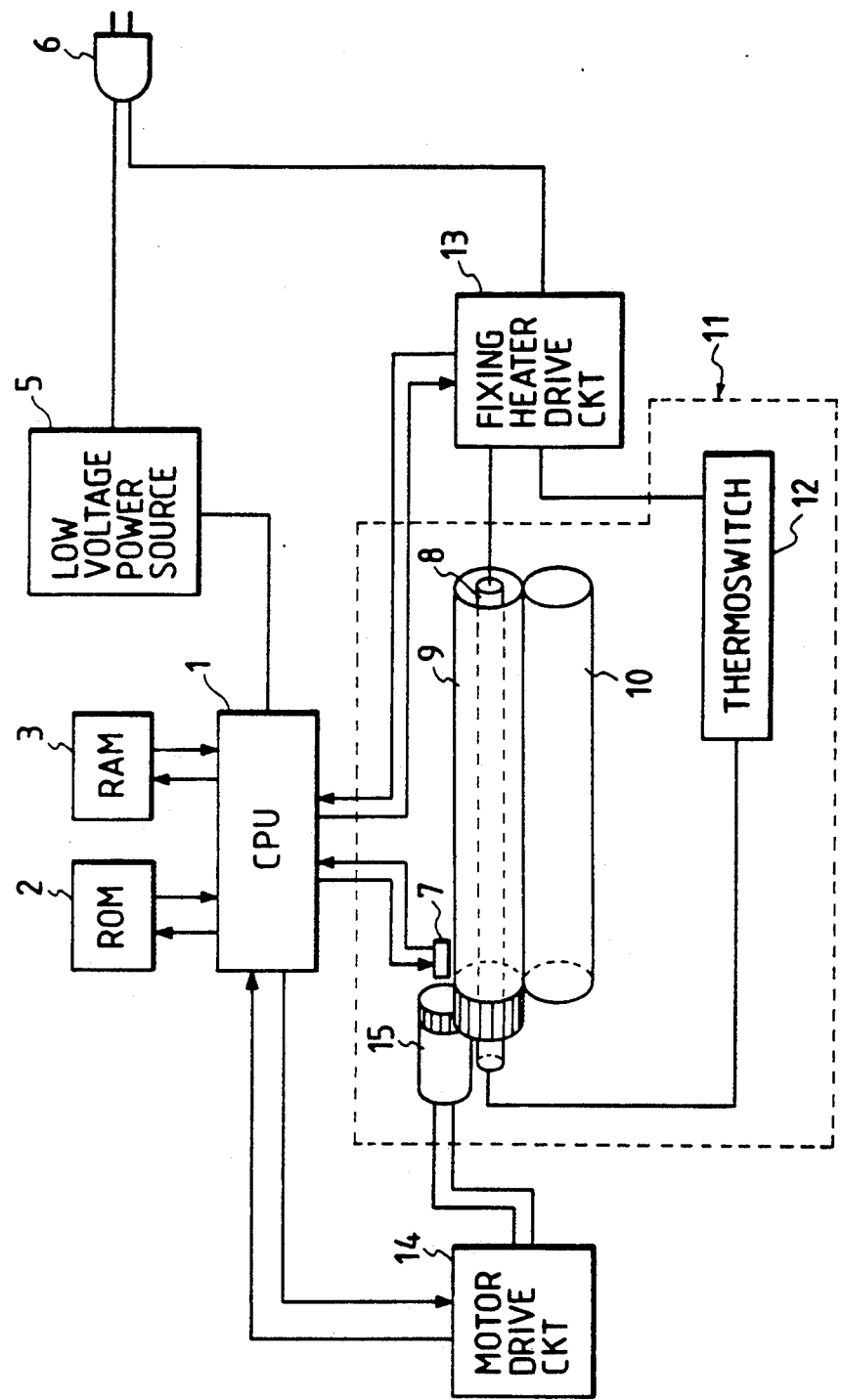
FIG. 1 is a block diagram showing the first embodiment of the present invention.

FIG. 1 shows a structure of a fixing device (fixing means) 11, its control circuit, and the like. A main motor 15 is arranged near the left edge portion of a fixing roller (heating member) 9. The main motor 15 transmits a rotational driving force to the fixing roller 9 via gears, and rotates the fixing roller 9 in a predetermined direction. When a transfer medium (not shown) is fed to a nip between the roller 9 and a press roller 10, the press roller 10 compresses in the direction of the fixing roller 9 feeds the transfer medium to a still downstream side while being driven by the roller 9.

A halogen heater (heating member) 8 arranged in the fixing roller 9 adopts one having a rated voltage of 100 V and a rated power of 665 W, and is connected to a fixing heater drive circuit 13. The fixing heater drive circuit 13 controls the heat value of the heater 8 on the basis of a signal from a CPU (control means) 1, thereby setting the surface temperature on the fixing roller 9 a desired value. The halogen heater 8 is also connected to a thermoswitch 12. When the fixing heater drive circuit 13 malfunctions, and the temperature on the fixing roller 9 is abnormally increased, the thermoswitch 12 stops energization. A thermistor (temperature detection element) 7 contacts the outer circumferential surface of the fixing roller 9, in particular, a portion which does not contact a transfer medium to be fed. A maximum of a B4-size transfer medium can pass between the fixing roller 9 and the press roller 10, and the process speed of the transfer medium is set to be 49 mm/sec as in the conventional example.

The CPU (central processing unit) 1 connected to the fixing motor drive circuit 13 executes so-called fuzzy control so as to maintain the heat value of the halogen heater 8 to fall within a predetermined range. In order to execute the fuzzy control, the CPU 1 is connected to a ROM (storage means) 2 for storing fuzz rules and membership functions, and a RAM (inference means) 3 used as a working area upon execution of fuzzy inference. The CPU 1 is connected to a low voltage power source 5, which converts a commercial power source voltage obtained by connecting a plug 6 to an outlet into a low voltage, and supplies the low voltage to the CPU 1.

The following condition variables are used in the fuzzy control of this embodiment:

① a deviation RT of a current output value of the thermistor 7 at room temperature from a preset ideal room temperature value (output value of the thermistor 7);

② a thermistor output value gradient DRT as a change amount of thermistor output per unit time; and ③ a thermistor output value S. The condition variable ② varies depending on a variation in power in watts of the halogen heater 8, the voltage drift of a commercial power source, an environmental condition of the main body, the contact state of the thermistor 7, and the like.

The following control variable is used in the control to be executed based on these condition variables:

④ a deviation HT of an energizing time of the halogen heater 8 per unit time.

Fuzzy sets associated with these condition variables and control variable will be described below with reference to FIGS. 2A to 2D.

Figure 2A:
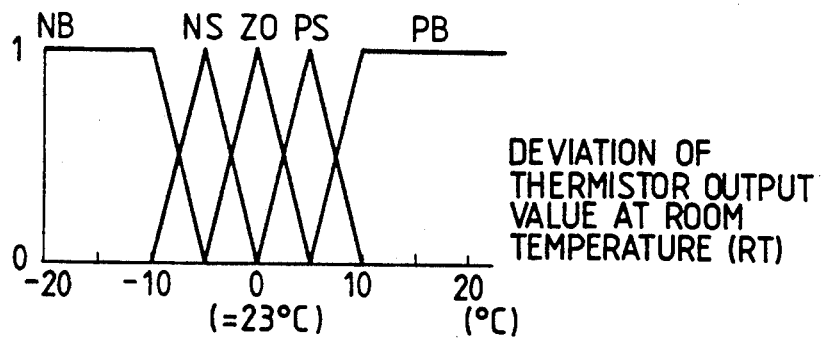
FIGS. 2A, 2B, 2C, and 2D are explanatory views showing fuzzy sets of the first embodiment.
Figure 2B:
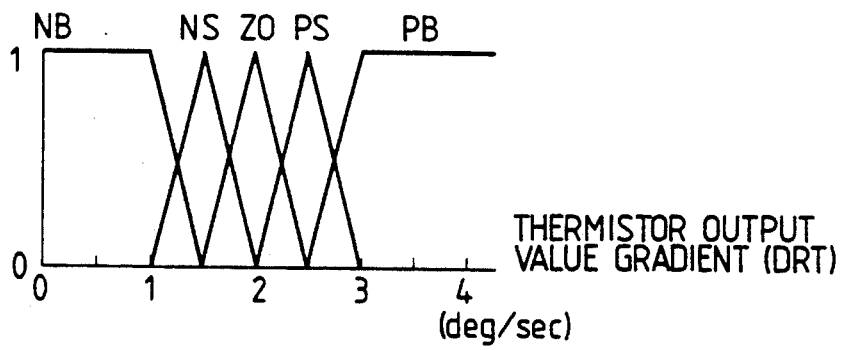
Figure 2C:
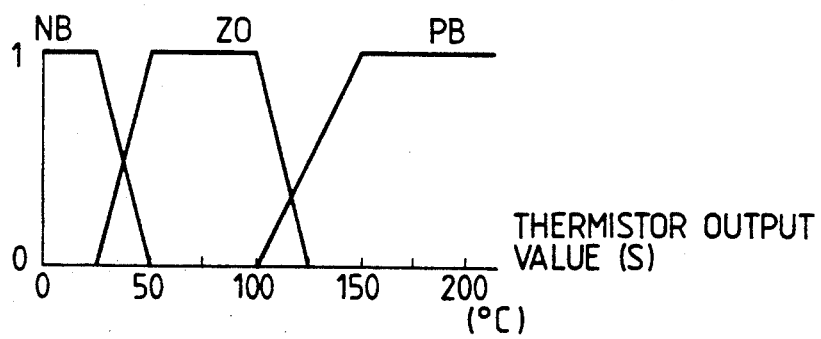
Figure 2D:
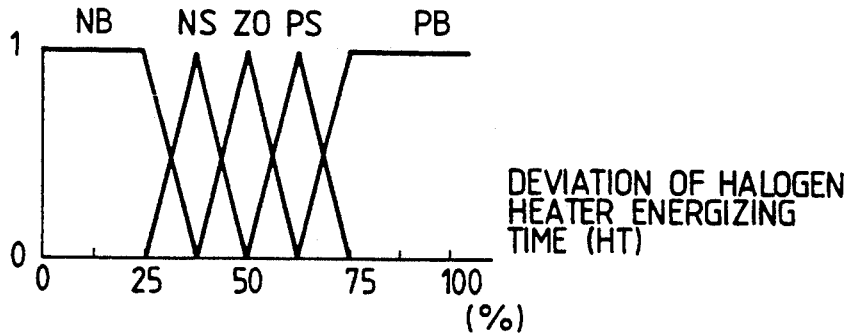

FIG. 2A shows a fuzzy set associated with the deviation RT of the thermistor output value at room temperature, FIG. 2B shows a fuzzy set associated with the thermistor output value gradient DRT, FIG. 2C shows a fuzzy set associated with the thermistor output value S, and FIG. 2D shows a fizzy set associated with the deviation HT of the energizing time of the halogen heater 8. Symbols in FIGS. 2A to 2D are the same as those generally used in an explanation of fuzzy control, and respectively have the following meanings:

1) NB (Negative Big):
a negative value having a large absolute value
2) NS (Negative Small):
a negative value having a small absolute value
3) ZO (Zero):
near 0
4) PS (Positive Small):
a positive value having a small absolute value
5) PB (Positive Big):
a positive value having a large absolute value How to read these drawings will be explained below using ZO (Zero) in FIG. 2A. In FIG. 2A means that when the deviation RT of the thermistor output value at room temperature is 0° C. (ideal room temperature value: this means that the actual thermistor output indicates 23° C., and the deviation is 0° C. with reference to this value), a degree belonging to the set ZO is 1. Similarly, when the deviation RT of the thermistor output value at room temperature is −2.5° C. or 2.5° C., a degree belonging to the set ZO is 0.5.

Fuzzy rules used upon determination of the deviation HT of the halogen heater energizing time will be explained below with reference to FIG. 3.

Thirty-five fuzzy rules shown in FIG. 3 are used when the control variable (the deviation HT of the halogen heater energizing time) is determined on the basis of the above-mentioned three condition variables (the deviation RT of the thermistor output value at room temperature, the thermistor output value gradient DRT, and the thermistor output value S).

For example, Rule 1 means that "if ([IF] in the table) the deviation RT of the thermistor output value at room temperature is NB ([RT is NB]), and ([and]) the thermistor output value gradient DRT is NB ([DRT is NB]), and ([and]) the thermistor output value S is NB ([S is NB]), ([THEN]) the deviation HT of the halogen heater energizing time is set to be PB ([HT is PB])".

Similarly, Rule 2 means that "if the deviation RT of the thermistor output value at room temperature is NB, and the thermistor output value gradient DRT is NS, and the thermistor output value S is NB, the deviation HT of the halogen heater energizing time is set to be PB".

The reason why this embodiment adopts the fuzzy rules shown in FIG. 3 will be briefly explained below.

In FIG. 3, when RT is NB (of course, S is NB), the deviation HT of the halogen heater energizing time is set to be PB (Rules 1 to 5). In this case, since this means that the apparatus main body is arranged in a low-temperature environment, the deviation HT of the halogen heater energizing time requires a maximum power in watts independently of DRT.

When RT is NS (of course, S is NB as well), and DRT is NB, NS, or ZO, the deviation HT of the halogen heater energizing time is set to be PB to increase the power in watts of the halogen heater 8 (Rules 6 to 8). In this case, it is probable that the real power in watts of parts of the halogen heater 8 is equal to or lower than a designed value, an input voltage drifts toward a low-voltage side, or the contact state of the thermistor 7 suffers from a trouble. For this reason, it is probable that the elevating rate of the surface temperature on the fixing roller 9 becomes equal to or lower than a designed value. On the other hand, when RT is NS (of course, S is NB as well), and DRT is PS or PB, the deviation HT of the halogen heater energizing time is set to be PS to slightly decrease the power in watts of the halogen heater 8 (Rules 9 and 10). In this case, it is probable that the real power in watts of parts of the halogen heater 8 is equal to or higher than a designed value, or an input voltage drifts toward a high-voltage side although the apparatus main body is arranged in a lower-temperature environment.

When RT is ZO, PS, or PB (in this case, S is NB with a high probability), and DRT is NB or NS, the deviation HT of the halogen heater energizing time is set to be PS to slightly increase the power in watts of the halogen heater 8 (Rules 11, 12, 16, 17, 21, and 22). In this case, it is highly probable that the apparatus main body is equipped in an environment at 23° C. as ideal room temperature or in a high-temperature (about 40° C.) environment. However, it is also probable that the real power in watts of parts of the halogen heater 8 is lower than a designed value, an input voltage drifts toward a low-voltage side, or the contact state of the thermistor 7 suffers from a trouble. For this reason, the elevating rate of the surface temperature on the fixing roller is lowered. Also, when DRT is ZO, PS, or PB, since the power in watts of the halogen heater 8 need not be increased, the deviation HT of the halogen heater energizing time is set to be ZO to avoid unnecessary power consumption (Rules 13 to 15, 18 to 20, and 23 to 25).

When S is ZO (RT is PB, of course), it is highly probable that the surface temperature on the fixing roller at the position of the thermistor falls within a range from about 38° C. to about 113° C. (degree=0.5 or more). In this state, if DRT is NB or NS, since the elevating rate of the surface temperature on the fixing roller is relatively low, the deviation HT of the halogen heater energizing time is set to be PS (Rule 27). When DRT is ZO, PS, or PB, since the elevating rate of the surface temperature on the fixing roller is sufficiently high, the deviation HT of the halogen heater energizing time is set to be NS (Rules 28 to 30). Similarly, when S is PB, if DRT is NB or NS, the deviation HT of the halogen heater energizing time is set to be ZO; if DRT is ZO or PS, the deviation HT of the halogen heater energizing time is set to be NB (Rules 33 to 35).

Fuzzy control executed using these fuzzy rules will be described below.

Assume that the fixing device 11 is started (the power in watts of the halogen heater is 665 W, and the elevating rate of the surface temperature on the fixing roller is about 2.3 deg/sec) under a condition that the copying apparatus (fixing device 11) is equipped in a room-temperature environment (23° C.), and does not suffer from an input voltage drift (input voltage=100 V). Condition variables at this time are RT=0 ($=x_1$), DRT=2.3 ($=y_1$), and S=23 ($=z_2$). When all the rules shown in FIG. 3 are applied to these condition variables, the degree of HT becomes 0 for the rules other than Rules 13 and 14. Thus, Rules 13 and 14 will be examined below with reference to FIGS. 4A and 4B.

Figure 4A:
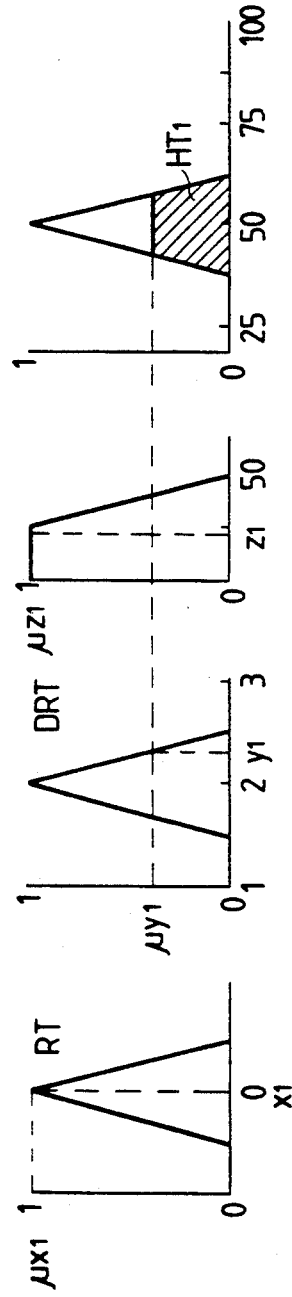
FIGS. 4A and 4B are explanatory views for explaining fuzzy inference (immediately after an apparatus is started) in the first embodiment.

In Rule 13, as shown in FIG. 4A, the deviation RT of the thermistor output value at room temperature is included in the set ZO at a degree of $\mu x_1$ ($=1$) with respect to the input $x_1$ according to its membership function, the thermistor output value gradient DRT is included in the set ZO at a degree of $\mu y_1$ ($=0.375$) with respect to the input $y_1$ according to its membership function, and the thermistor output value S is included in the set NB at a degree of $\mu z_1$ ($-1$) with respect to the input $z_1$ according to its membership function. A minimum value of these degrees $\mu x_1$, $\mu y_1$, and $\mu z_1$ is calculated, and a MIN calculation between the minimum value and the membership function of the deviation HT of the halogen heater energizing time is then calculated, thus obtaining a trapezoid indicated by a hatched portion $HT_1$.

Figure 4B:
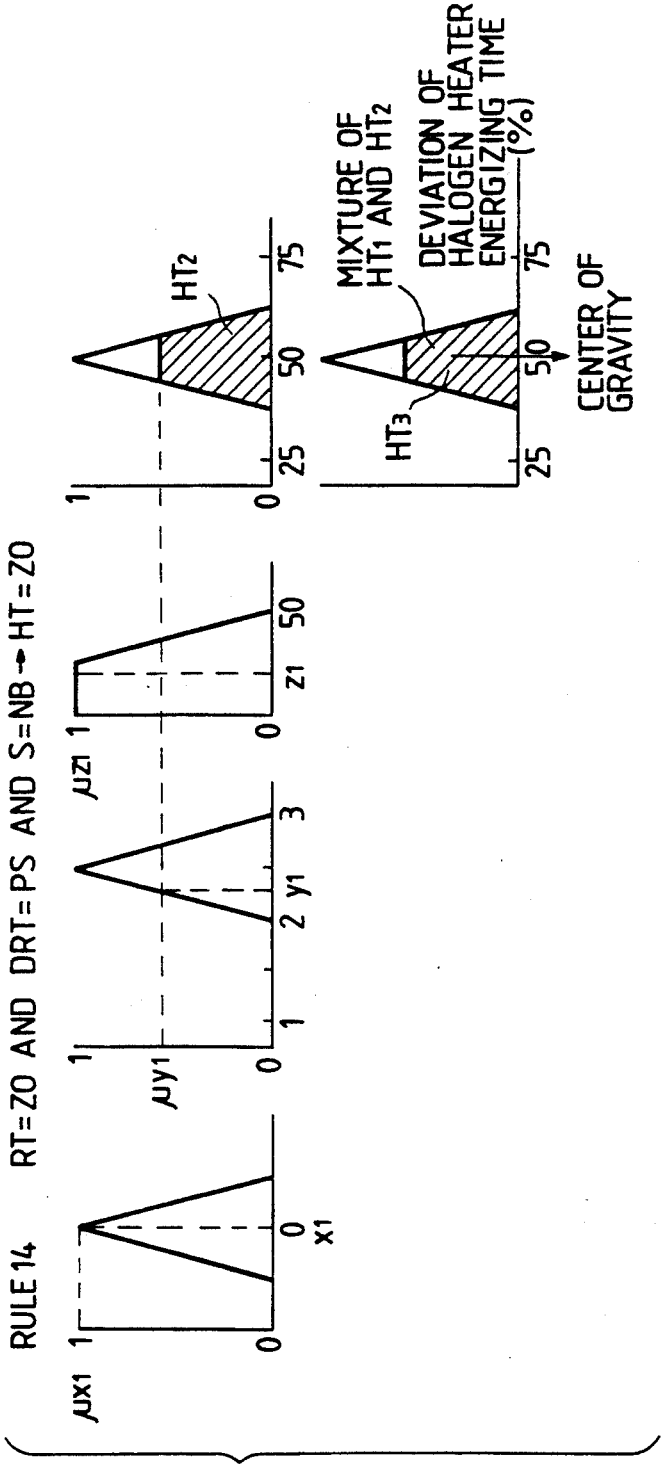

Also, in Rule 14, when similar calculations are performed, as shown in FIG. 4B, a trapezoid indicated by a hatched portion $HT_2$ is obtained. Maximum values of the sets $HT_1$ and $HT_2$ are calculated to form a new set indicated by a hatched portion $HT_3$. A value obtained by calculating the center of gravity of the new set $HT_3$ is set as the deviation HT of the halogen heater energizing time obtained by the fuzzy inference. With this setting value, the fixing heater drive circuit 13 is driven to heat the fixing roller 9.

The above-mentioned fuzzy control is executed every 5-sec interval in practice after the fixing device 11 is started. The fuzzy control state will be explained below with reference to FIG. 5.

As described above, assume that the apparatus main body is equipped in a room-temperature environment (23° C.), and an input voltage is 100 V. When the apparatus is started (STEP 1), the fixing heater drive circuit 13 is started by the CPU 1, and as a result, the halogen heater 8 is energized by 100% (STEP 2). At this time, the fixing heater drive circuit 13 applies a voltage of 100 V to the halogen heater 8, and the consumption power of the halogen heater 8 becomes 665 W. Consequently, the surface temperature on the fixing roller elevates at a gradient of about 2.3 deg/sec (as has been described above).

After an elapse of 5 sec from energization of the halogen heater 8, the CPU 1 executes fuzzy inference (STEP 3), and output data (S=34.5° C.) from the thermistor 7 is input to the CPU 1 (STEP 4). Other condition variables necessary for the fuzzy inference are RT=11.5 and DRT=2.3 (STEP 6). Based on these data, the CPU 1 executes reasoning by fuzzy logic, i.e., the fuzzy inference according to the rules shown in FIG. 3.

Figure 6A:
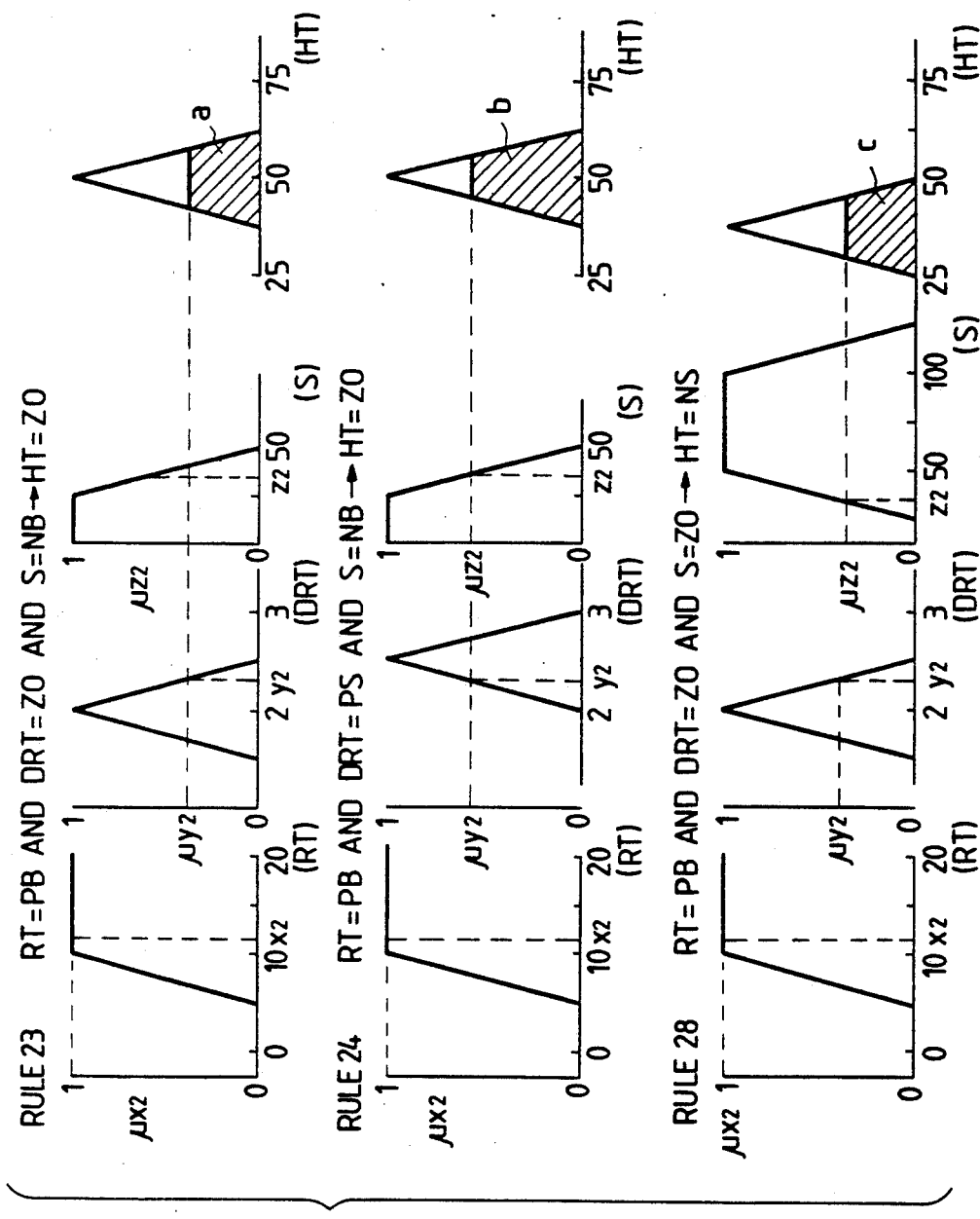
FIG. 6 is comprised of FIGS. 6A and 6B showing explanatory views for explaining fuzzy inference (after an elapse of 5 sec) in the first embodiment.
Figure 6B:
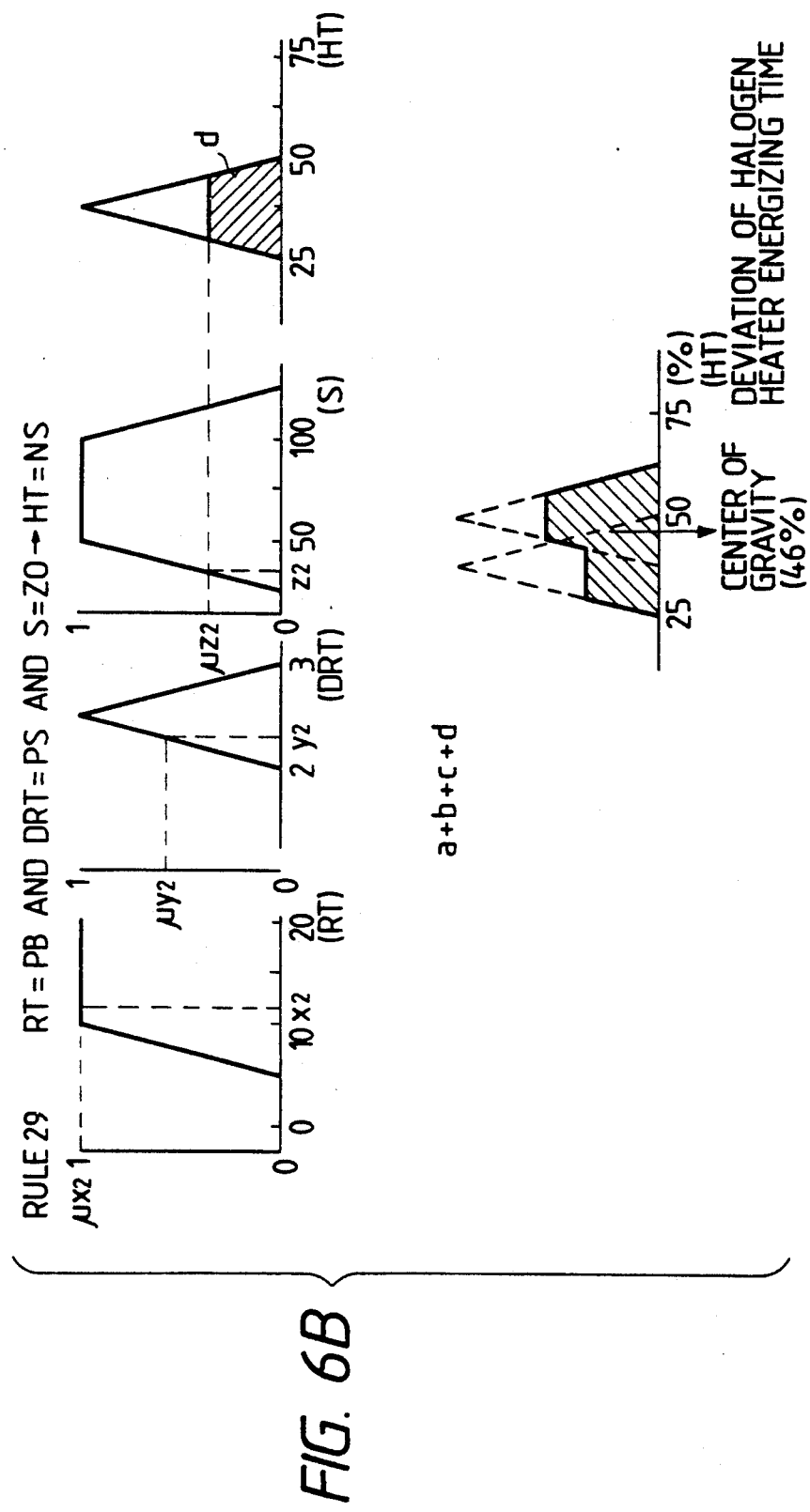
Figure 42:
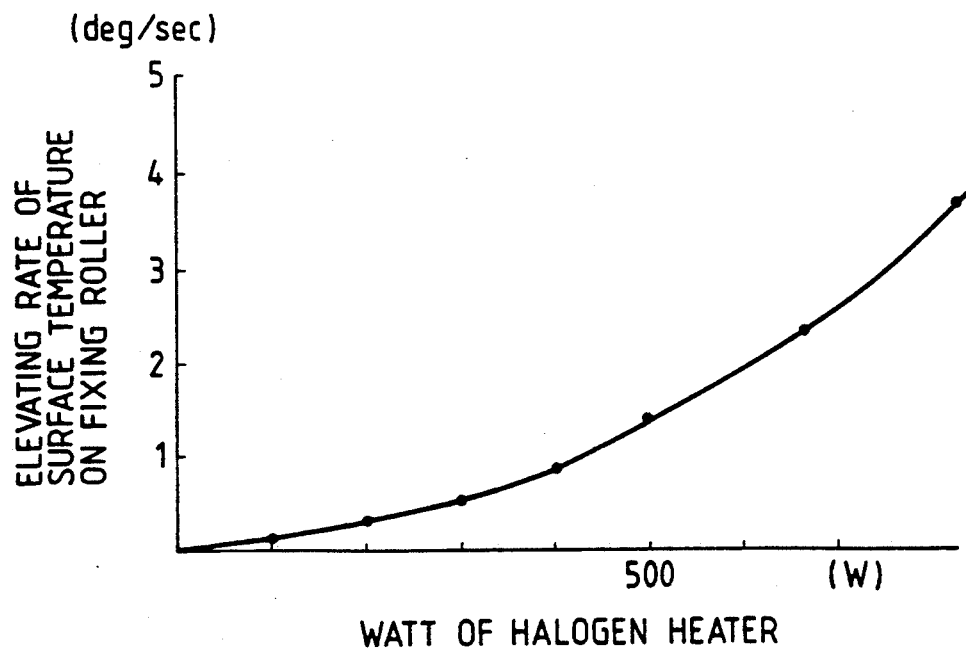
FIG. 42 is a graph showing the relationship between the power in watts of a halogen heater and the elevating rate of the surface temperature of a fixing roller.

In this case, rules with which the degrees of the membership function of the deviation HT of the halogen heater energizing time assume values other than 0 are Rules 23, 24, 28, and 29 (STEPs 7 and 8). The same fuzzy control described above with reference to FIGS. 4A and 4B are executed for these rules (see FIG. 6). As a result, the deviation HT of the halogen heater energizing time is determined to be 46% (STEP 10), and the CPU 1 controls the fixing heater drive circuit 13 to shorten the energizing time of the halogen heater 8 to 46% a full energizing state (STEP 11). The power in watts of the halogen heater 8 becomes about 306 W, and the elevating rate of the surface temperature on the fixing roller is decreased to 0.6 deg/sec (see FIG. 42).

Figure 7:
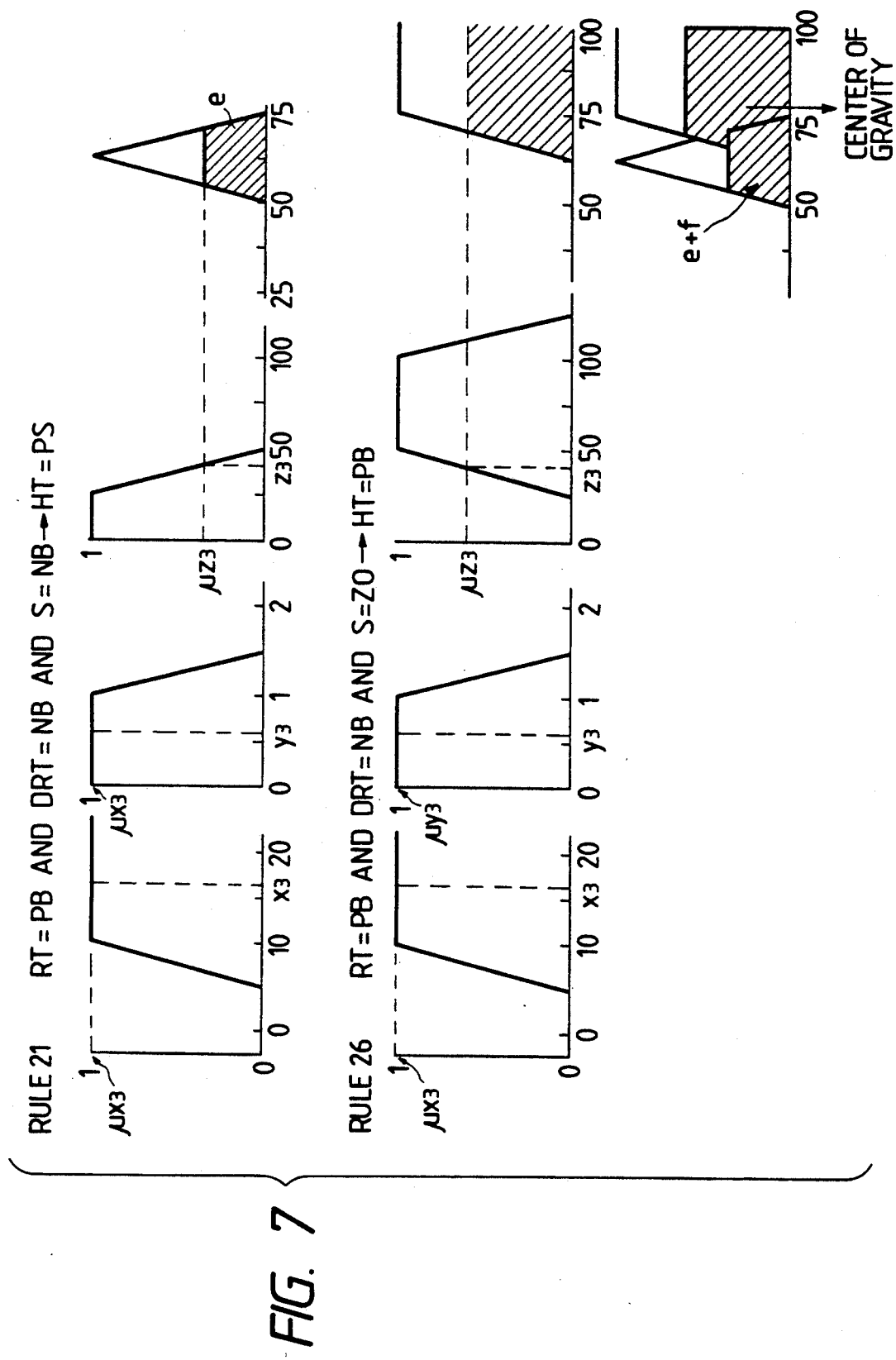
FIG. 7 is an explanatory view for explaining fuzzy inference (after an elapse of 10 sec) in the first embodiment.

After an elapse of about 5 sec from the fuzzy control, the CPU 1 executes another fuzzy control to calculate the deviation HT of the energizing time of the halogen heater 8 (STEP 10). At this time, condition variables are RT=16.5, DRT=0.6, and S=39.5, and the degree of HT other than those of Rules 21 and 26 becomes 0. Then, the same fuzzy control described above with reference to FIGS. 4A and 4B is executed (see FIG. 7), and as a result, the deviation HT of the halogen heater energizing time is determined to be 80%. The power in watts of the halogen heater 8 is controlled to be 532 W, and the elevating rate of the surface temperature on the fixing roller is set to be 1.5 deg/sec from FIG. 42.

Figure 9:
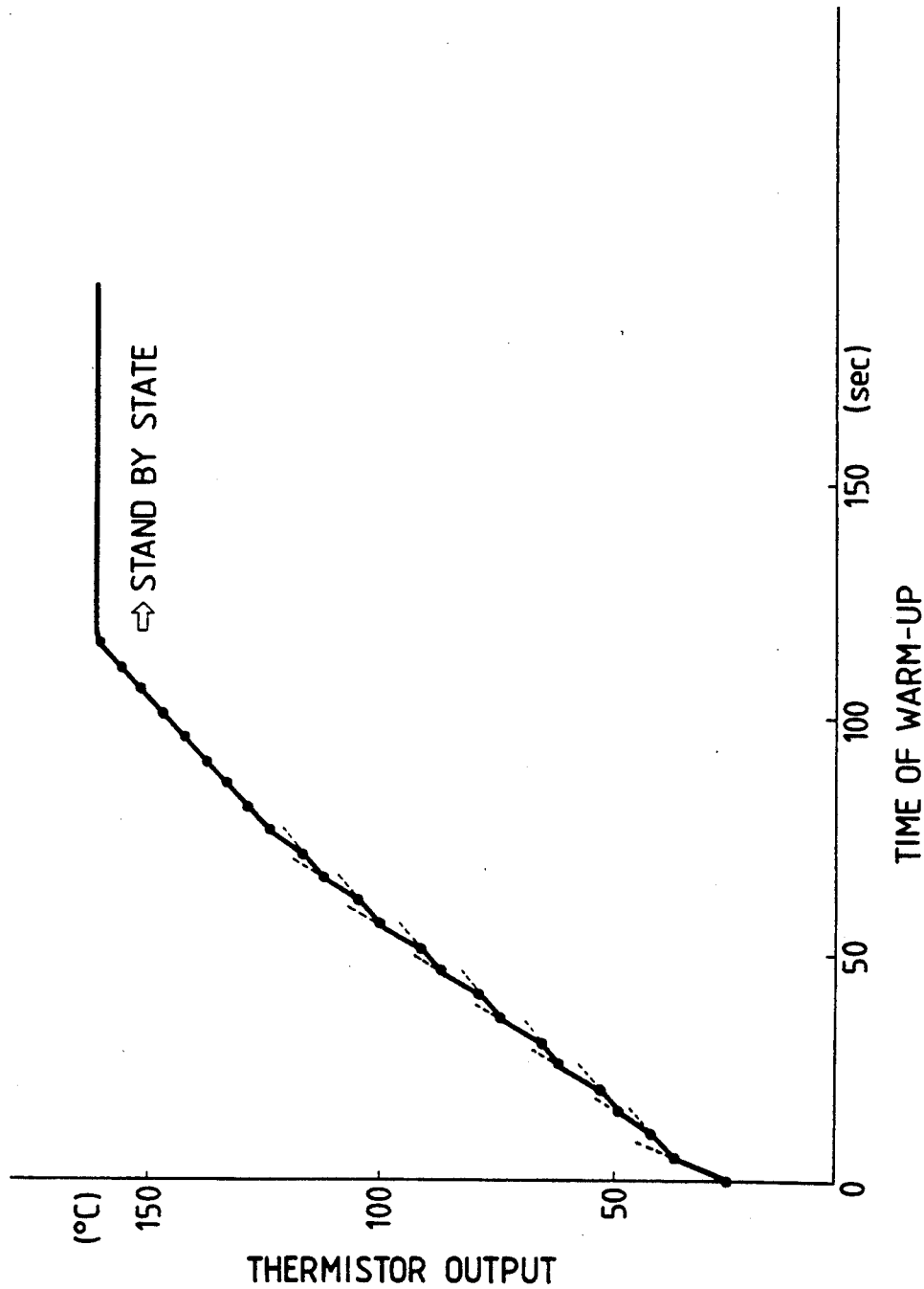
FIG. 9 is a graph showing fuzzy control results in the first embodiment.

In this manner, the fuzzy control is repeated until the thermistor output S becomes equal to or higher than a stand-by temperature $S_1$. When the thermistor output S becomes equal to or higher than the stand-by temperature $S_1$, the fuzzy control is stopped, and a message indicating that the fixing device 11 is in a stand-by state is displayed (STEP 12). FIGS. 8 and 9 show such fuzzy control processes. Of these figures, FIG. 8 summarizes changes in condition variables (RT, DRT, and S), control variable (HT), and power in watts of the halogen heater.

A case will be described below wherein an input voltage drifts by +15% (input voltage=115 V).

When the power switch of the apparatus equipped in an environment at 23° C. is turned on, the halogen heater 8 is energized by 100%, as described above. At this time, since the input voltage drifts by +15%, the drifted voltage (115 V) is applied to the halogen heater 8, and the consumption power of the halogen heater 8 becomes 825 W. The surface temperature on the fixing roller elevates at a gradient of about 3.7 deg/sec.

Figure 10:
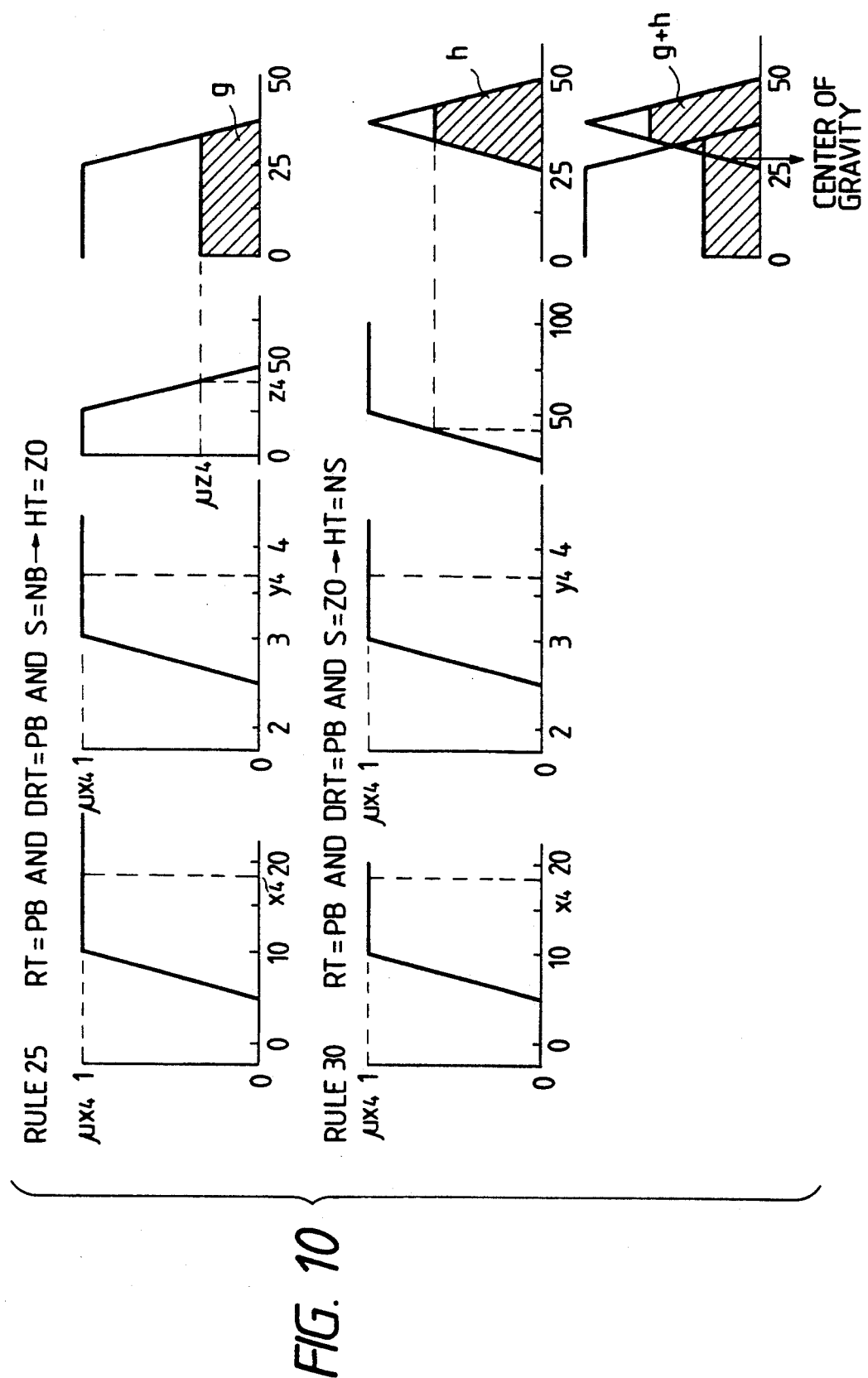
FIG. 10 is an explanatory view for explaining fuzzy inference (when input voltage=115 V) in the first embodiment.
Figure 12:
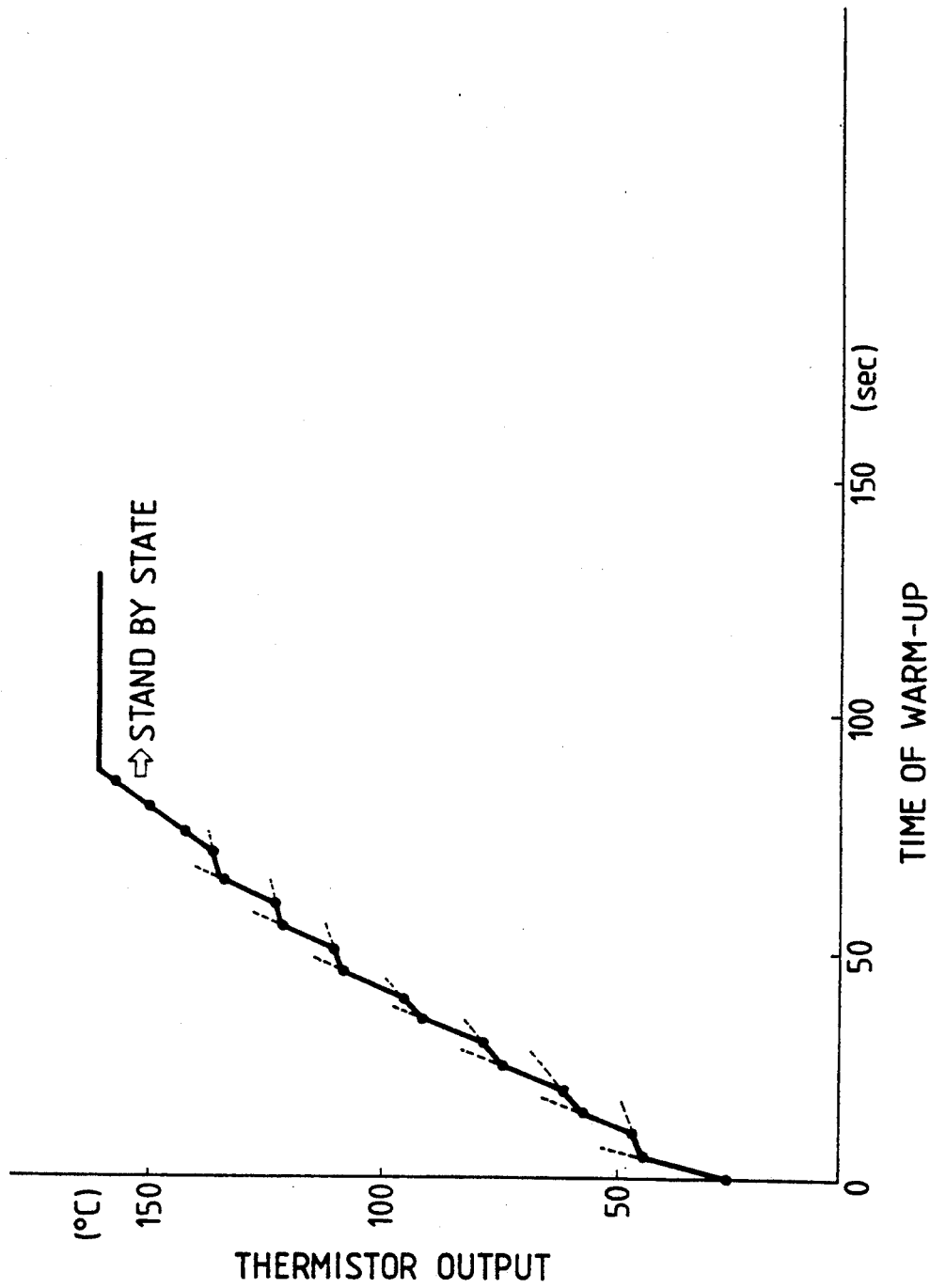
FIG. 12 is a graph showing fuzzy control results in the first embodiment.

After an elapse of 5 sec, the same fuzzy inference as described above is executed based on condition variables RT=18.5 ($=x_4$), DRT=3.7 ($=y_4$), and S=41.5 ($=z_4$) according to all the rules shown in FIG. 3. In this case, rules with which the degrees of HT have values other than 0 are Rules 25 and 30. The same fuzzy control as described above with reference to FIGS. 4A and 4B is executed for these rules (see FIG. 10). As a result, the deviation HT of the halogen heater energizing time is determined to be 28%, and the CPU 1 controls the fixing heater drive circuit 13 to decrease the energizing time of the halogen heater 8 to 28% a full energizing state. Thus, the power in watts of the halogen heater 8 is decreased to 231 W. Thereafter, fuzzy control is executed every 5-sec interval to set the fixing device 11 in a stand-by state. The fuzzy control results are shown in FIGS. 11 and 12.

A case will be described below wherein an input voltage drifts by −15% (85 V).

Figure 13B:
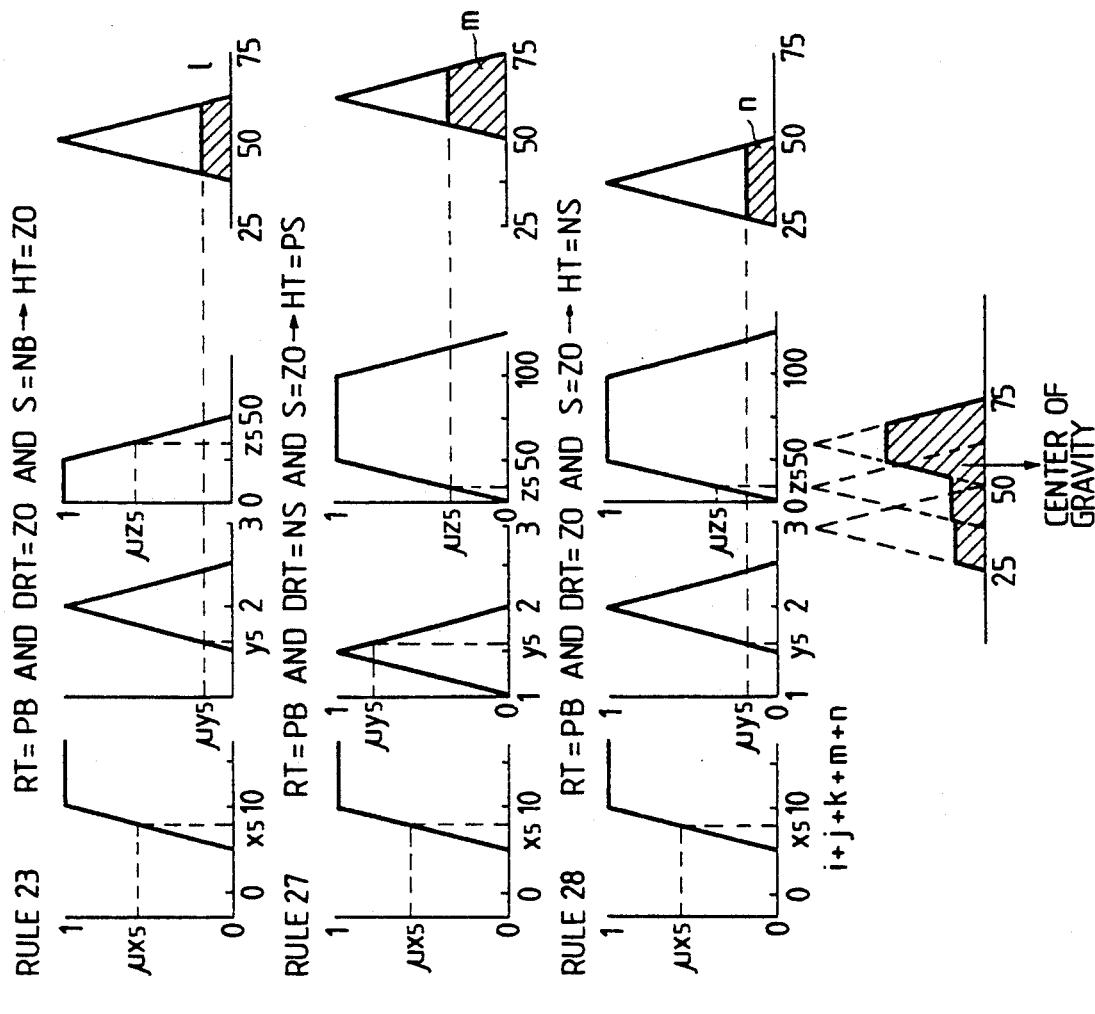
FIG. 13 is comprised of FIGS. 13A and 13B showing explanatory views for explaining fuzzy inference (when input voltage=85 V) in the first embodiment.
Figure 15:
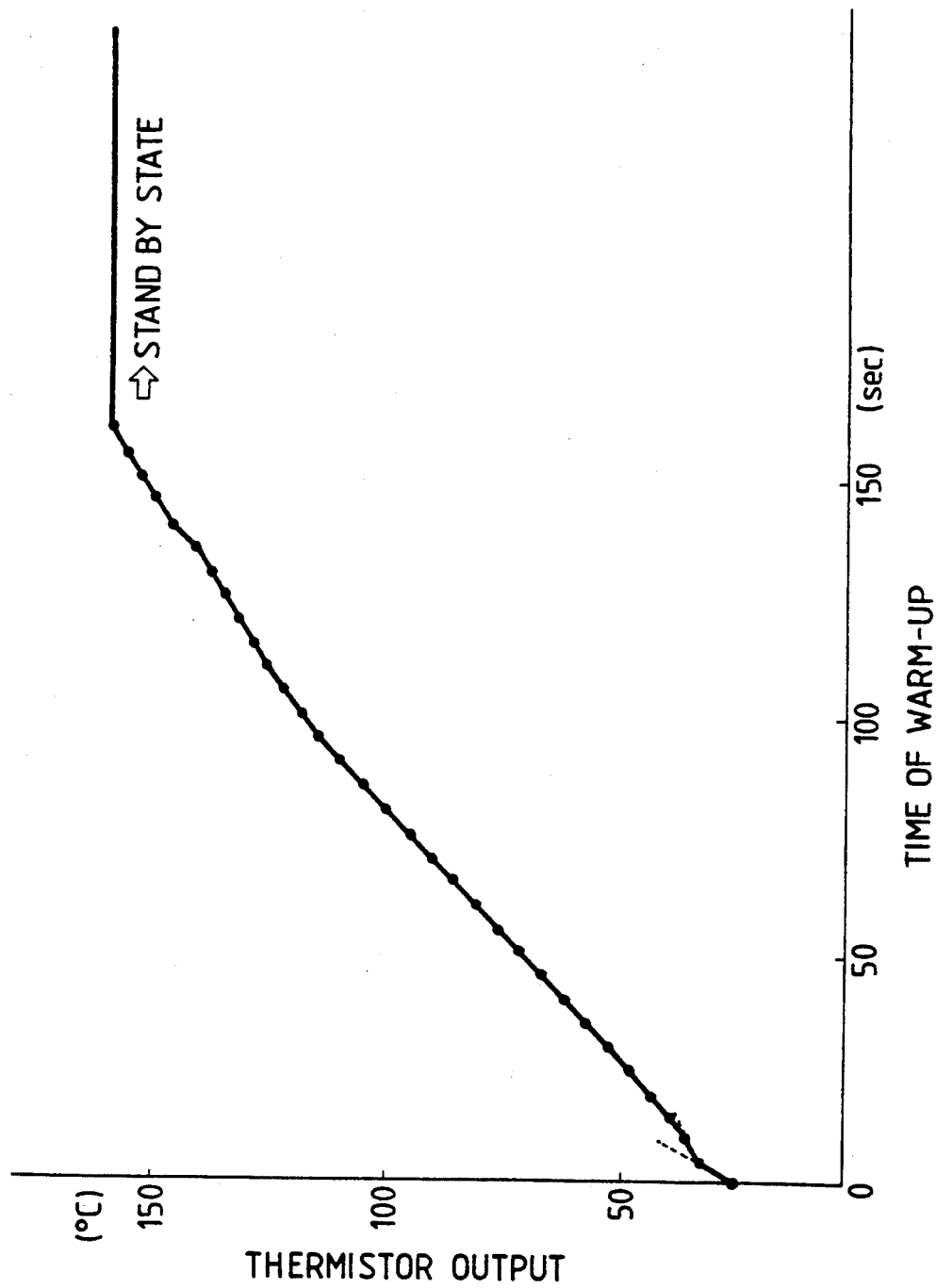
FIG. 15 is a graph showing fuzzy control results in the first embodiment.

When the power switch of the apparatus equipped in an environment at 23° C. is turned on, the halogen heater 8 is energized by 100%, as described above. At this time, since the input voltage drifts by −15%, the drifted voltage (85 V) is applied to the halogen heater 8, and the consumption power of the halogen heater 8 becomes 518 W. The surface temperature on the fixing roller elevates at a gradient of about 3.7 deg/sec. FIGS. 13A and 13B show the first fuzzy inference processes, and FIGS. 14 and 15 show fuzzy control results.

In this manner, even when the input voltage to the low voltage power source 5 drifts, variations in average power in watts of the halogen heater and in average elevating rate of the surface temperature on the fixing roller become smaller than those of the conventional example. Therefore, even when the input voltage becomes high, a so-called overshoot state can be prevented. Also, since the variations of this embodiment are about 24% to about 42% the conventional variations, the temperature control of the fixing roller 9 can be stabilized, and consumption power itself can be suppressed (about 59% to about 74%).

FIG. 16 shows variations in average consumption power of the halogen heater 8 and average elevating rate of the surface temperature on the fixing roller 9 during execution of fuzzy control (from a power-ON state to a stand-by state) upon comparison with the conventional example.

In this embodiment, the present invention is applied to a commercial power source of 100 V. However, the present invention is not limited to this, and is particularly effective for a commercial power source, which is used for both a 100 V system/200 V system. In this embodiment, the heat value of the halogen heater 8 is controlled based on the energizing time of the halogen heater 8. However, the present invention is not limited to this. For example, the AC phase of a voltage waveform output from the low voltage power source 5 may be controlled to control the power in watts of the halogen heater 8.

The second embodiment of the present invention will be described below with reference to FIGS. 17 to 28.

Figure 17:
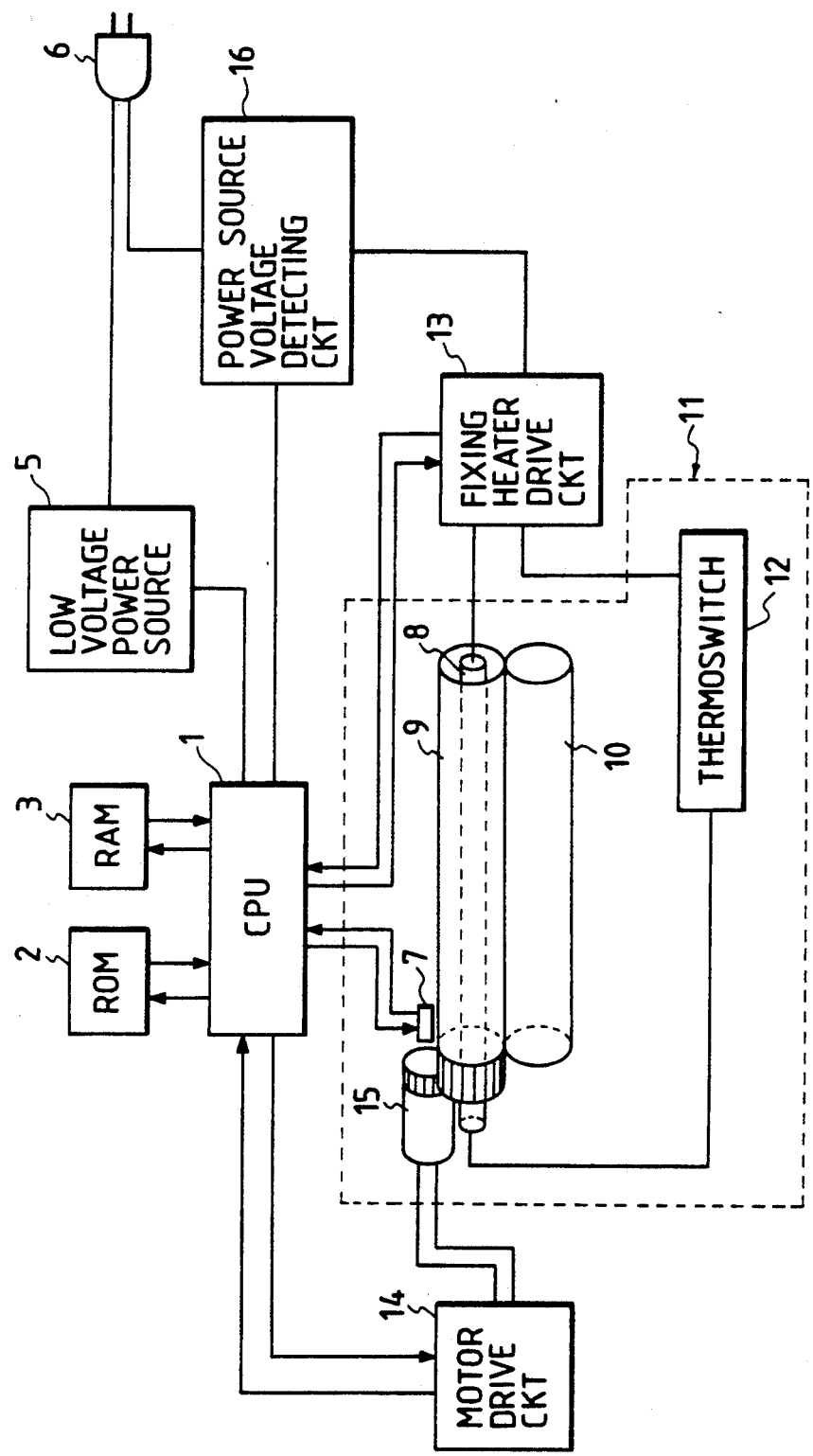
FIG. 17 is a block diagram showing the second embodiment of the present invention.
Figure 18A:
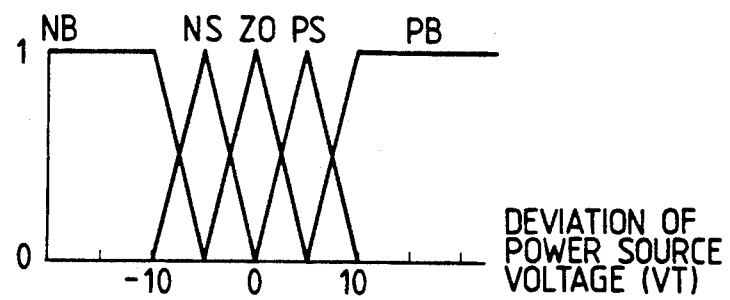
FIGS. 18A, 18B, 18C, and 18D are explanatory views showing fuzzy sets of the second embodiment.
Figure 18B:
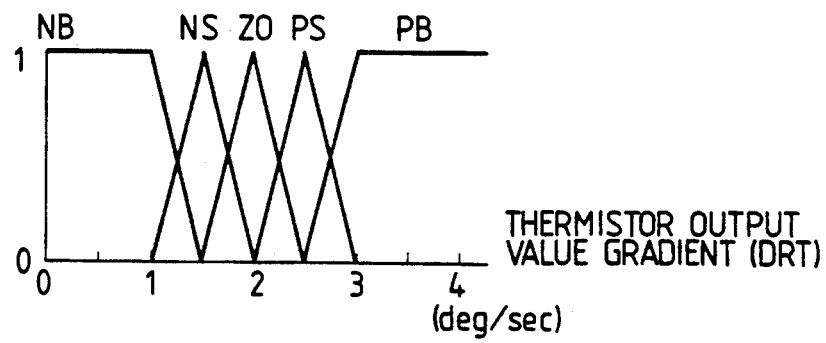
Figure 18C:
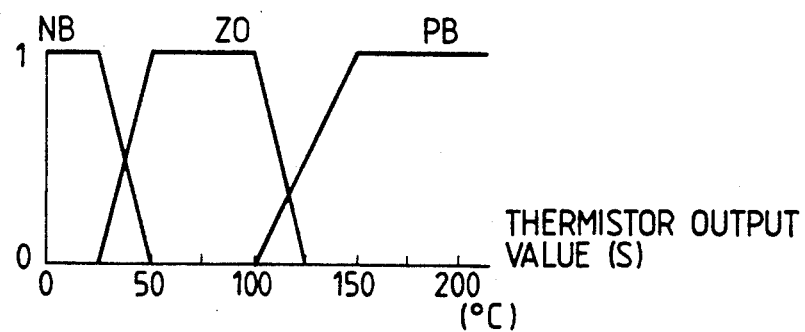
Figure 18D:
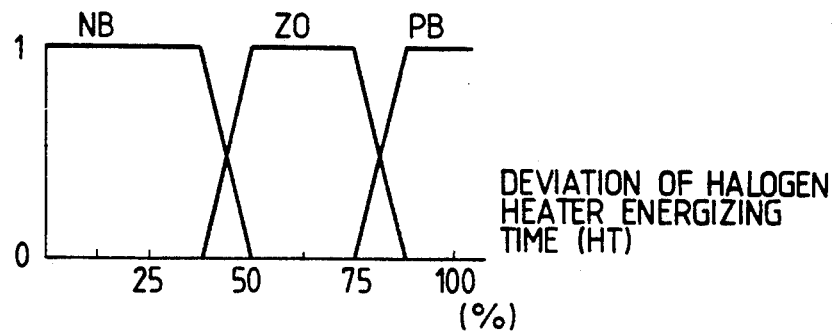

FIG. 17 is a block diagram showing the structure of a fixing device 11, its control circuit, and the like. In FIG. 17, a power source voltage detecting circuit 16 for detecting an input power source voltage is arranged between a plug 6 and a fixing heater drive circuit 13. The detection result of the power source voltage detecting circuit 16 is transmitted to a CPU 1.

The following three control variables are used in this embodiment:

① a deviation VT of a power source voltage with respect to a rated power source voltage;

② a thermistor output value gradient DRT as a change amount of thermistor output per unit time; and ③ a thermistor output value S.

As in the above embodiment, the following control variable is used:

④ a deviation HT of an energizing time of a halogen heater 8 per unit time.

Figure 20:
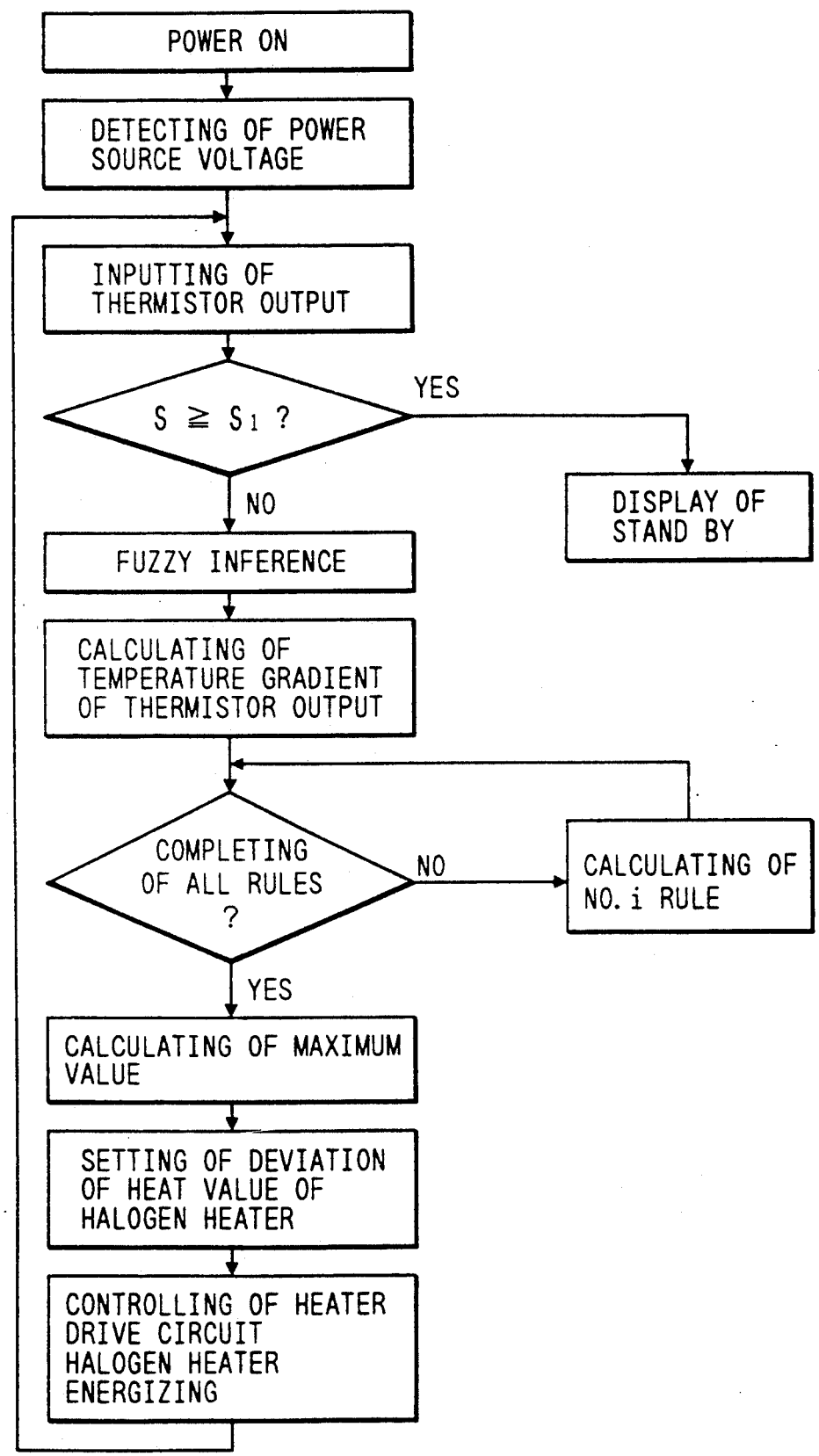
FIG. 20 is a flow chart showing fuzzy control in the second embodiment.
Figure 21:
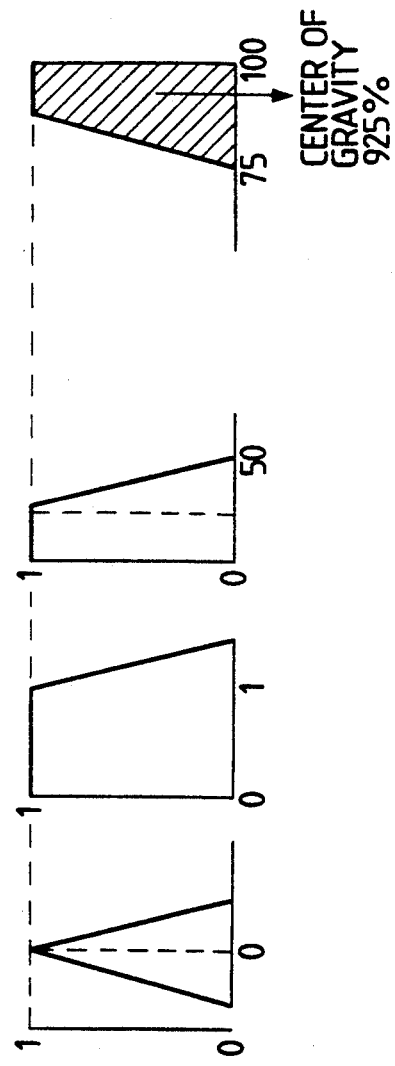
FIG. 21 is an explanatory view for explaining fuzzy inference in the second embodiment.
Figure 22:
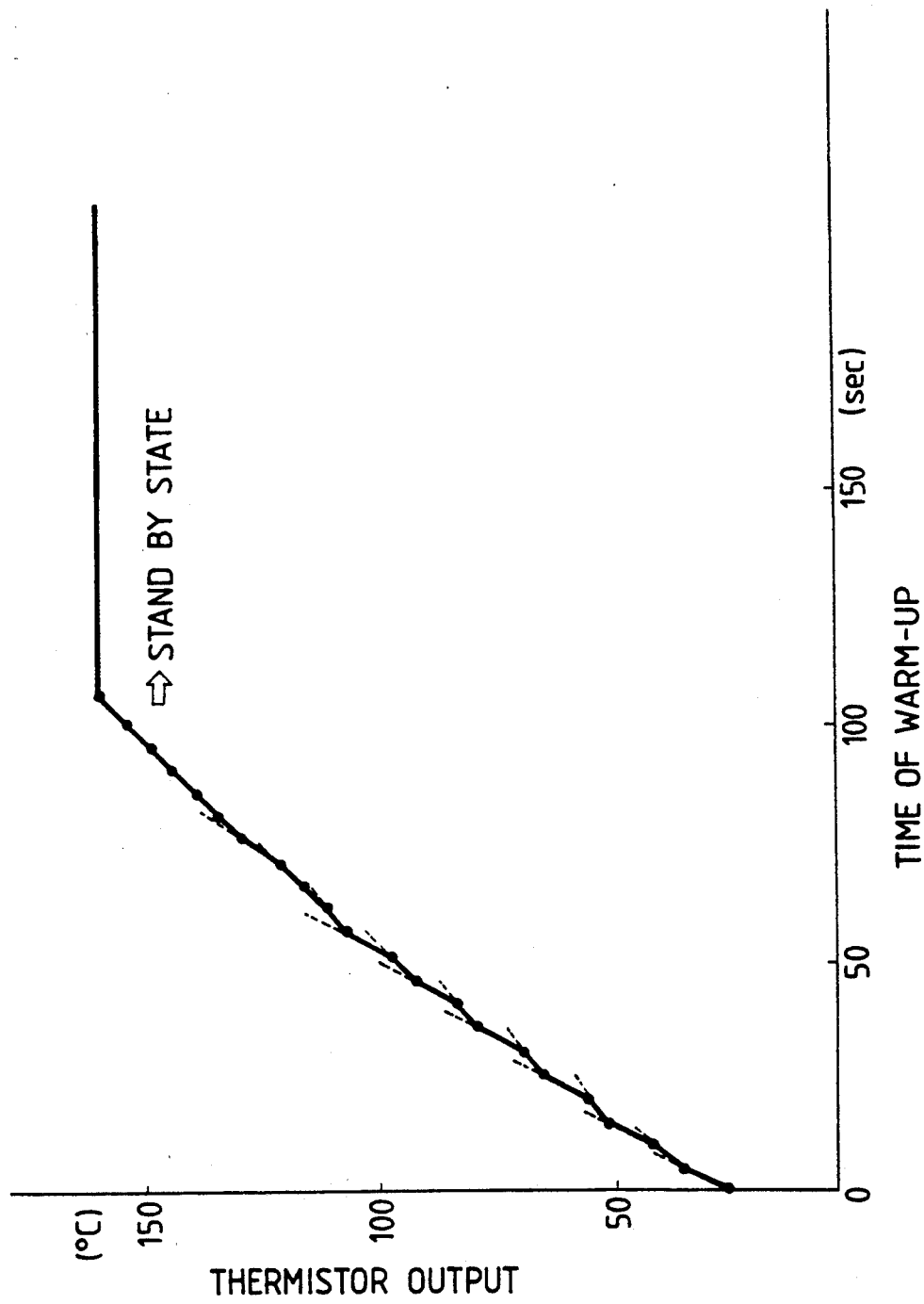
FIG. 22 is a graph showing results of fuzzy control (when input voltage=100 V) in the second embodiment.

FIGS. 18A to 18D show membership functions of these condition variables and control variable, FIG. 19 shows fuzzy rules, and FIG. 20 is a flow chart showing fuzzy control. FIG. 21 shows a first fuzzy inference state executed when the main body is equipped in an environment at 23° C., and a power source voltage is 100 V, and FIGS. 22 and 23 show all fuzzy inference results. In this case, since condition variables immediately after power-ON are VT=0 (=ZO), DRT=0 (=NB), and S=23 (=NB), HT=PB is obtained from Rule 11 shown in FIG. 19, and as a result of fuzzy inference, the deviation of the halogen heater energizing time is determined to be 92.5% (FIG. 21).

Figure 24:
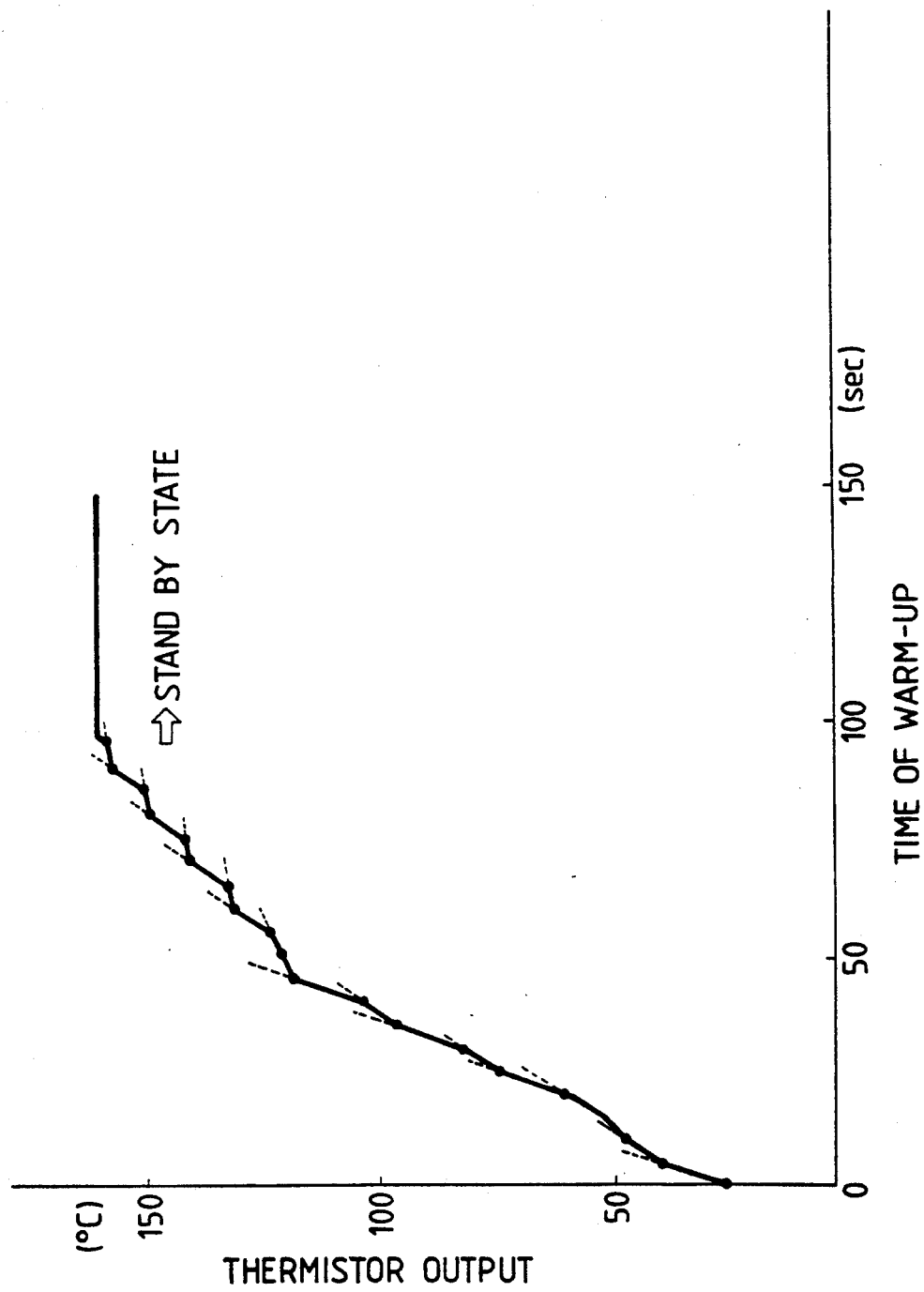
FIG. 24 is a graph showing results of fuzzy control (when input voltage=115 V) in the second embodiment.

A case will be described below wherein the power source voltage drifts by +15%, i.e., to 115 V in the same environment described above. In this case, since VT=15 (=PB), DRT=0 (=NB), and S=23 (=NB) immediately after power-ON, HT=PB is obtained from Rule 21, and as a result of fuzzy inference, the deviation of the halogen heater energizing time is determined to be 92.5%. A description of the subsequent fuzzy inference processes will be omitted, and only their results are shown in FIGS. 24 and 25.

Figure 26:
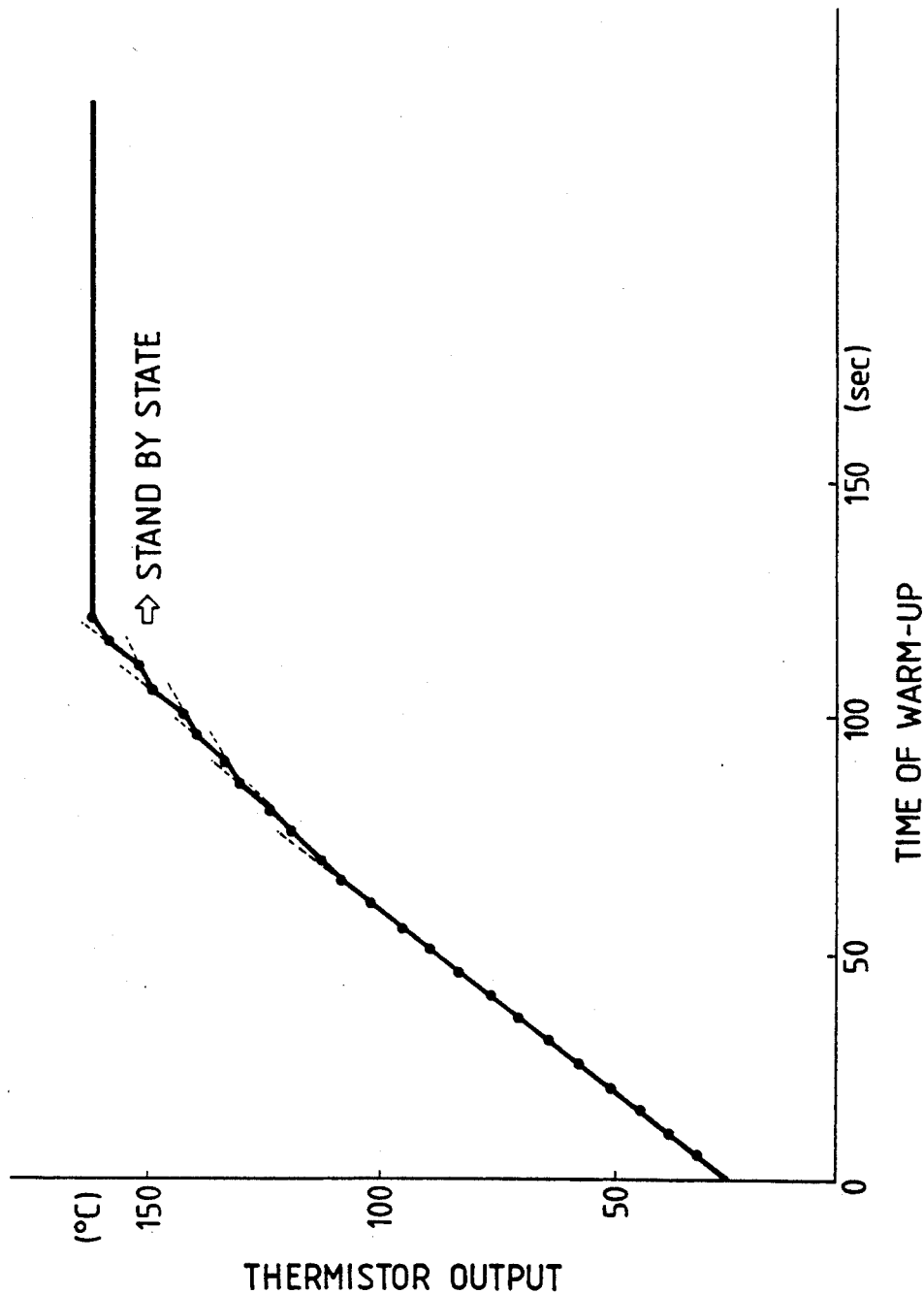
FIG. 26 is a graph showing results of fuzzy control (when input voltage=85 V) in the second embodiment.
Figure 29:
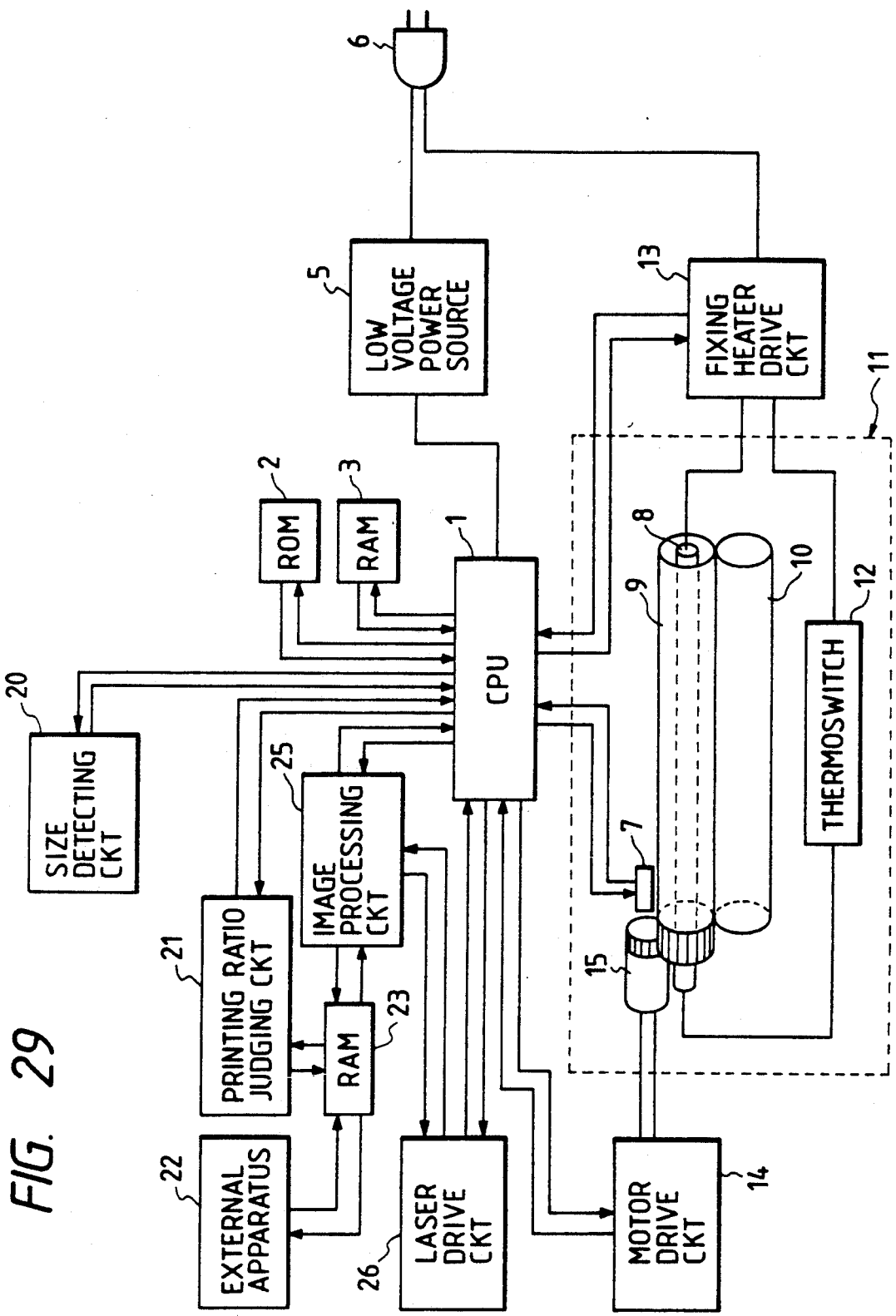
FIG. 29 is a block diagram showing the third embodiment of the present invention.

A case will be described below wherein the power source voltage drifts by −15%, i.e., to 85 V in the same environment described above. In this case, since VT=−15 (=NB), DRT=0 (=NB), and S=23 (=NB) immediately after power-ON, HT=PB is obtained from Rule 1, and as a result of fuzzy inference, the deviation of the halogen heater energizing time is determined to be 92.5%. A description of the subsequent fuzzy inference processes will be omitted, and only their results are shown in FIGS. 26 and 27.

As described above, even when the input voltage to a low voltage power source 5 drifts, variations in average power in watts of the halogen heater 8 and in average elevating rate of the surface temperature on the fixing roller become smaller than those in the conventional example. In this embodiment, the variation in average consumption power of the halogen heater 8 can be remarkably suppressed to as low as about 5.6% to 18% that of the conventional example. Therefore, even when the input voltage becomes high, a so-called overshoot state can be prevented. Also, the temperature control of a fixing roller 9 can be stabilized, and consumption power itself can be suppressed. FIG. 28 shows variations in average consumption power of the halogen heater 8 and average elevating rate of the surface temperature on the fixing roller 9 during execution of fuzzy control (from a power-ON state to a stand-by state) in comparison with the conventional example.

In this embodiment, the present invention is applied to a commercial power source of 100 V. However, the present invention is not limited to this, and is particularly effective for a commercial power source, which is used for both a 100 V system/200 V system. In this embodiment, the heat value of the halogen heater 8 is controlled based on the energizing time of the halogen heater 8. However, the present invention is not limited to this. For example, the AC phase of a voltage waveform output from the low voltage power source 5 may be controlled to control the power in watts of the halogen heater 8.

The third embodiment of the present invention will be described below with reference to FIGS. 29 to 35.

A CPU 1 is connected to a size detecting circuit 20 and a printing ratio judging circuit 21 as condition variable detection means for detecting condition variables used for controlling the surface temperature of a fixing roller 9. Of these circuits, the size detecting circuit 20 detects the size of a transfer medium J to be fed to a fixing device 11, and the printing ratio judging circuit 21 detects the printing ratio per transfer medium on the basis of image data from an external apparatus 22 such as a computer or an image input section of a scanner, a digital copying apparatus, or the like. The printing ratio judging circuit 21 is connected to a RAM 23, and the RAM 23 temporarily stores data of the printing ratio judging circuit 21.

The RAM 23 is connected to an image processing circuit 25, and image data is subjected to proper image processing by the image processing circuit 25. The processed image data is supplied to a laser drive circuit 26 according to an instruction from the CPU 1, and the laser drive circuit 26 radiates a laser beam onto a photosensitive drum (not shown) on the basis of the input image data. A description of an image information forming process will be omitted here.

Note that a fixing temperature at which a toner image with a high printing ratio can be sufficiently fixed on a transfer medium (normal paper such as A4-, B4-, or B5-size paper) when the apparatus is equipped in an environment at ideal room temperature (23° C.) is defined as a setting value $T_{02}$, ($T_{02}=180°$ C.).

In this embodiment, the following condition variables are used in fuzzy control:

① a deviation RT of a thermistor output value at room temperature when the power switch of the main body is turned on with respect to a preset ideal room temperature value (an output value of the thermistor; 23° C. in this embodiment);

② a size P of a transfer medium; and

③ a printing ratio I per page of image data to be output.

Also, the following control variable is used:

④ a temperature deviation t with respect to the preset fixing temperature $T_{02}$.

FIGS. 30A, 30B, 30C, and 30D show fuzzy sets called membership functions of the above-mentioned condition variables ① to ③ and the control variable ④. Note that the meanings of symbols (NB, NS, ZO, PS, and PB) in FIGS. 30A to 30D, and how to read these figures are the same as those described above with reference to FIGS. 2A to 2D in the first embodiment.

FIG. 31 shows fuzzy rules of this embodiment. For example, a certain fuzzy rule means that "if the deviation RT of the thermistor output value at room temperature is NB, and the size P of the transfer medium is NB, and the printing ratio I per page is NB, set the temperature deviation t of the fixing temperature to be PS".

The fixing temperature must be increased when thick paper such as a postal card, an envelope, or the like, in particular, small-size thick paper, is fed in a low-temperature environment, and when the printing ratio is high (near a solid-black image). In FIG. 31, a case wherein RT=NB or NS and I=ZO to PB is close to this state. Furthermore, when P=NB, this tendency strongly appears. In consideration of the above-mentioned facts, as shown in FIG. 31, t is set to be PS or PB so as to assure fixing characteristics.

When the printing ratio is low (e.g., when a character image is formed) in a high-temperature environment, the fixing temperature can be set to be lower than that in a normal environment.

Figure 32:
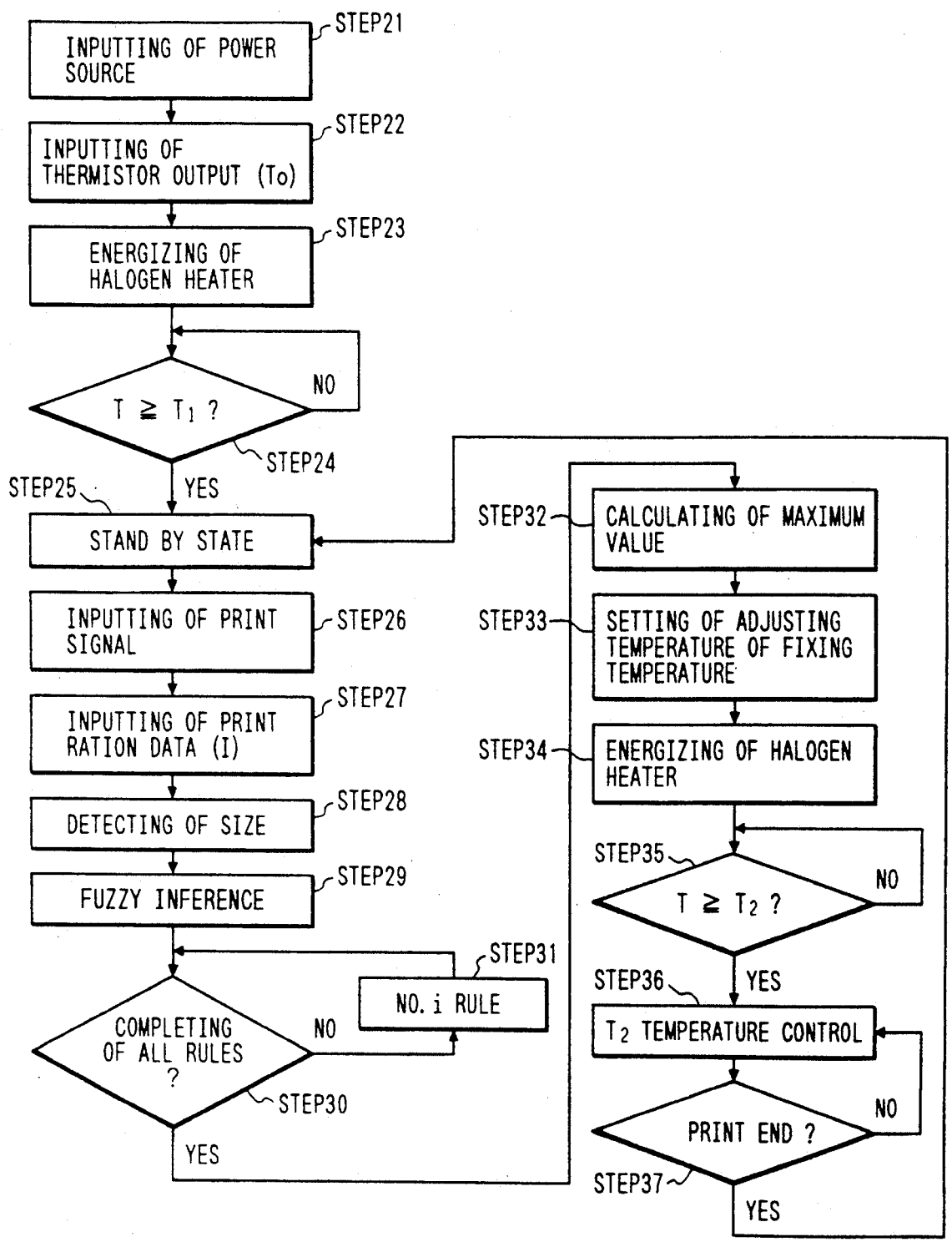
FIG. 32 is a flow chart showing fuzzy control in the third embodiment.
Figure 33:
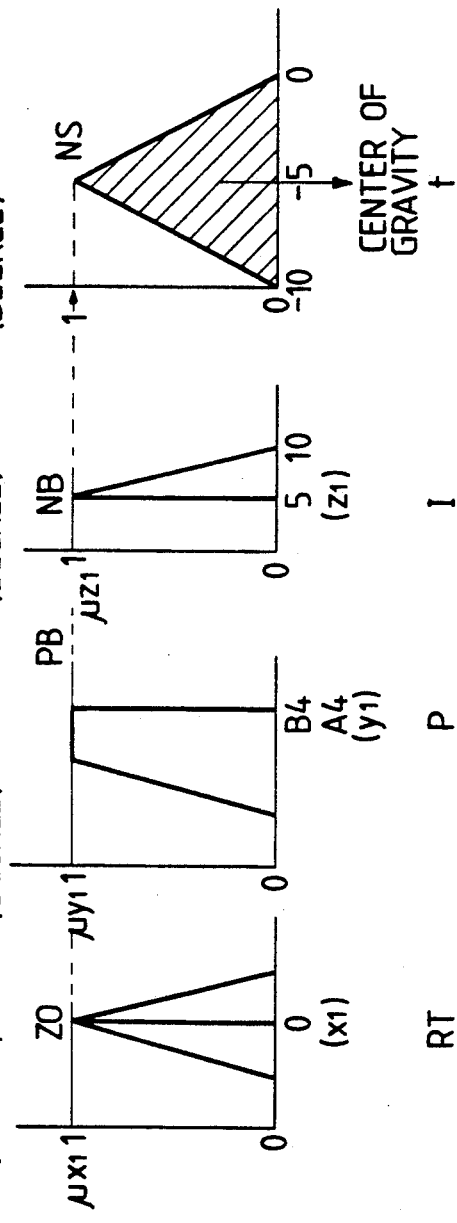
FIG. 33 is an explanatory view for explaining fuzzy inference in the third embodiment.

Fuzzy control executed using these fuzzy rules will be described below with reference to FIGS. 32 and 33.

A case will be described below wherein the apparatus main body is equipped in a room-temperature environment (23° C.), and a character image formed on a transfer medium (B4 size) at a printing ratio of 5% is to be fixed (operation example 1).

When the power switch of the main body apparatus is turned on (STEP 21 in FIG. 32), an output $T_0$ from a thermistor 7 is input to the CPU 1 (STEP 22), and is temporarily stored in a RAM 3. The CPU 1 issues an instruction to a fixing heater drive circuit 13 to energize a halogen heater 8 at 100% (STEP 23). If it is determined that the output T from the thermistor 7 has reached a preset stand-by temperature $T_1$ (STEP 24), the CPU 1 determines that the main body apparatus is set in a stand-by state (STEP 25), and controls the surface temperature of the fixing roller to the stand-by temperature $T_1$.

When a print signal is input (STEP 26), the CPU 1 causes the printing ratio judging circuit 21 to calculate the printing ratio per page of image data based on data stored in the RAM 23 for temporarily storing image data from the external apparatus 22. The CPU 1 temporarily stores the calculation result in the RAM 3 (STEP 27). The CPU 1 receives data of the size of the transfer medium from the transfer medium size detection circuit 20, and temporarily stores the data in the RAM 3 (STEP 28). Furthermore, the CPU 1 reads out the membership functions shown in FIGS. 30A to 30D, and the fuzzy rules shown in FIG. 31 from a ROM 2, and executes fuzzy inference on the basis of the previously input data (the thermistor output $T_0$, the printing ratio I per page, and the size P of the transfer medium) (STEP 29). Note that the deviation RT of the thermistor output at room temperature is calculated by RT=$T_0$−23, and the fuzzy inference is executed using the RAM 3 as a working area for calculations.

In the fuzzy control of the operation example 1, the CPU 1 calculates sets to which the condition variables belong and their degrees. In this operation example, the condition variables are RT=0 (=$x_1$), P=B4 (=$y_1$), and I=5 (=$z_1$), and of the fuzzy rules shown in FIG. 31, rules with which the temperature deviations t with respect to the fixing temperature $T_{02}$ have values other than 0 are as follows:

IF RT is ZO & P is PB & I is NB
THEN t is NS

In this case, the degree of RT belonging to ZO is 1.0, the degree of P belonging to PB is 1.0, and the degree of I belonging to NB is 1.0. Based on a minimum value of the degrees ($\mu x_1$, $\mu y_1$, and $\mu z_1$) of the sets of these condition variables RT, P, and I, the degree of a set of the temperature deviation t is calculated. FIG. 33 shows this state. As can be seen from FIG. 33, the degree of t is 1.0, and is defuzzified by calculating the center of gravity of the set of t, thus obtaining an output value of t=−5.

The CPU 1 controls the surface temperature of the fixing roller 9 to 175° C. lower by 5° C. than the fixing temperature $T_{02}$. More specifically, when, e.g., a character image having a low printing ratio is fixed on normal paper such as B4-size paper, since good fixing characteristics can be obtained by a heat value smaller than a normal value, the fixing temperature is decreased by 5° C. from a setting value (18° C. in this case). In this manner, unnecessary energy consumption can be prevented, and formation of paper curls and wrinkles can also be avoided.

A case will be described below wherein the apparatus is equipped in an environment at room temperature of 5° C., and an image on a postal card is to be fixed. In this case, assume that a graphic image having a printing ratio of 40% close to a solid-black image is formed (operation example 2).

At this time, the condition variables are respectively RT=−18° C. (=$x_2$), P=postal card (=$y_2$), and I=40% (=$z_2$), and the degrees of the sets belonging to the corresponding membership functions are RT=NB (1.0), P=NB (1.0), and I=PB (1.0). Of the fuzzy rules shown in FIG. 31, rules with which the temperature deviations t with respect to the fixing temperature $T_{02}$ have values other than 0 are as follows:

IF RT is NB & P is NB & I is PB
THEN t is PB

Figure 34:
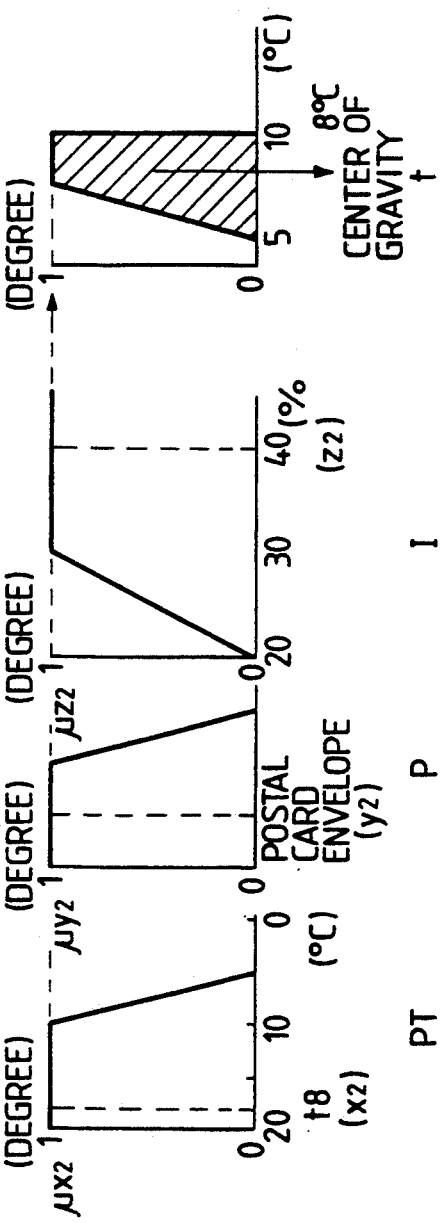
FIG. 34 is an explanatory view for explaining fuzzy inference in the third embodiment.

Based on this rule, the CPU 1 executes fuzzy inference. FIG. 34 shows this fuzzy inference state.

As a result of the fuzzy inference, t=8° C., and the surface temperature of the fixing roller 9 is controlled to a fixing temperature $T_2=T_0+8=188°$ C. More specifically, when thick paper such as a postal card is fed in a low-temperature environment, a relatively high fixing temperature is maintained to assure fixing characteristics. Note that the thick paper such as a postal card originally has a high stiffness. Since the stiffness is normally increased in a low-temperature environment, even when the fixing temperature is increased as in this operation example, paper curls and wrinkles are hard to form.

Furthermore, a case will be described below wherein the apparatus is equipped in an environment at room temperature of 32.5° C., and an image on B4-size normal paper is to be fixed. Note that a character image having a printing ratio of 5% is formed on the normal paper (operation example 3).

At this time, the condition variables are respectively RT=9.5° C. (=$x_3$), P=B4 (=$y_3$), and I=5% (=$z_3$), and the degrees of the sets belonging to the corresponding membership functions are RT=PS (0.1) or PB (0.9), P=PB (1.0), and I=NB (1.0). Therefore, rules contributing to fuzzy inference are:

IF RT is PS & P is PB & I is NB THEN t is NS
IF RT is PB & P is PB & I is NB THEN t is NB

Figure 35:
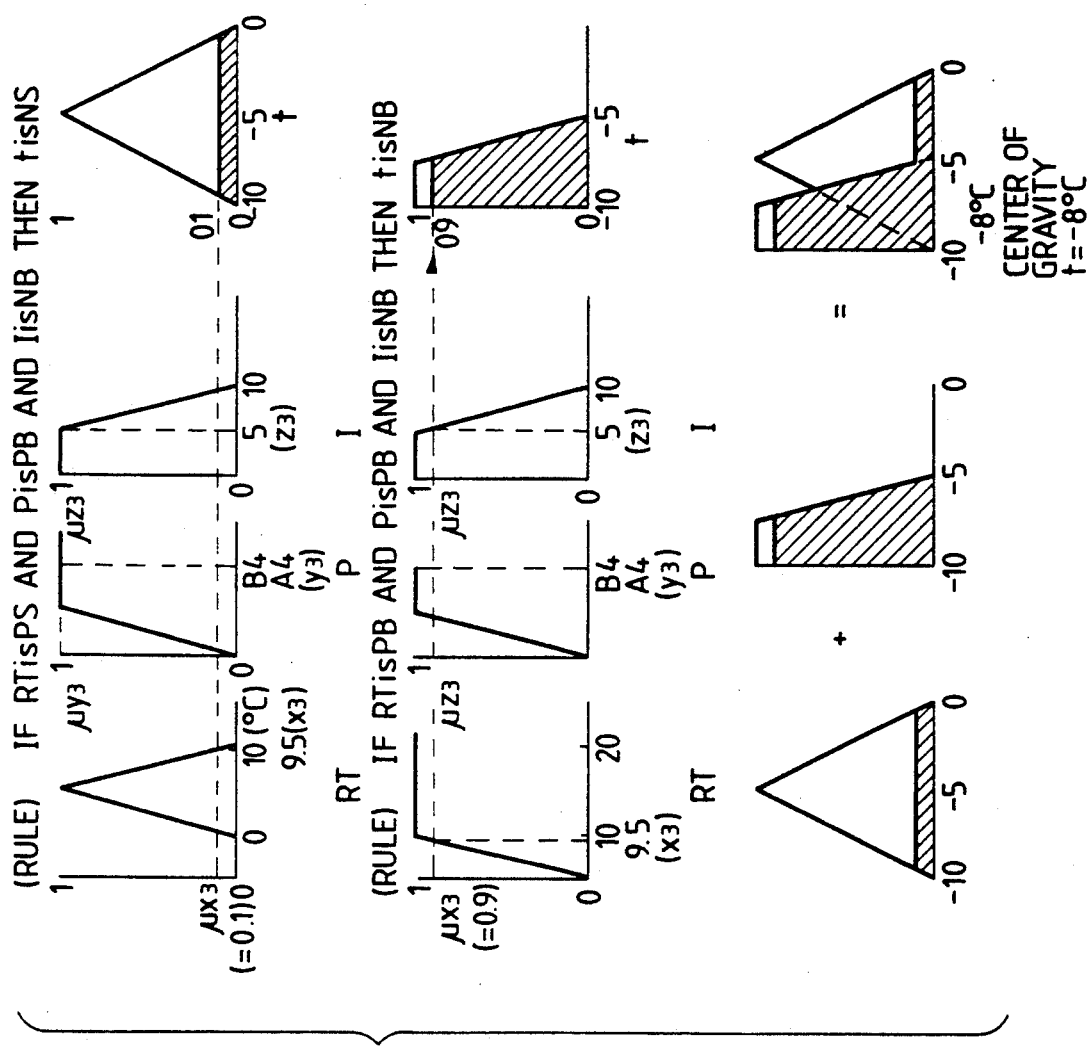
FIG. 35 is an explanatory view for explaining fuzzy inference in the third embodiment.

Based on these rules, fuzzy inference shown in FIG. 35 is executed.

In this operation example, based on a minimum value of the degrees ($\mu x_1$, $\mu y_1$, and $\mu z_1$) of the sets of these condition variables RT, P, and I, the degrees of sets of the temperature deviation t are calculated. Then, the sets t are converted into new sets indicated by hatching in FIG. 35 on the basis of their degrees (shaping), and these two sets are mixed to overlap each other so as to form a new set. The new set is defuzzified by calculating the center of gravity, thus obtaining a final output value t=−8° C. The CPU 1 then controls the surface temperature of the fixing roller 9 to attain a fixing temperature $T_2$ ($T_{02}−8°$ C.=172° C.). In this operation example, since a heat value necessary for fixing can be greatly decreased, energy consumption can be suppressed, and formation of paper curls or wrinkles can be avoided. Also, the temperature in the apparatus can be prevented from being unnecessarily increased.

According to this embodiment, since control is made based on an environment of the apparatus main body, the operating condition (e.g., a paper type, a printing pattern, and the like) of the apparatus, and the like, the surface temperature of the fixing roller 9 can be properly controlled. As a result, energy consumption can be suppressed, and formation of paper curls or wrinkles can be avoided. Also, the temperature in the apparatus can be prevented from being unnecessarily increased.

In the above embodiment, the deviation RT of the thermistor output at room temperature, which is input upon power-ON is stored, but may be kept stored in a memory for a predetermined period of time (about 30 minutes) after power-OFF. Thus, an operation for re-inputting the deviation RT can be omitted.

The fourth embodiment of the present invention will be described below with reference to FIGS. 36 to 40.

Figure 36:
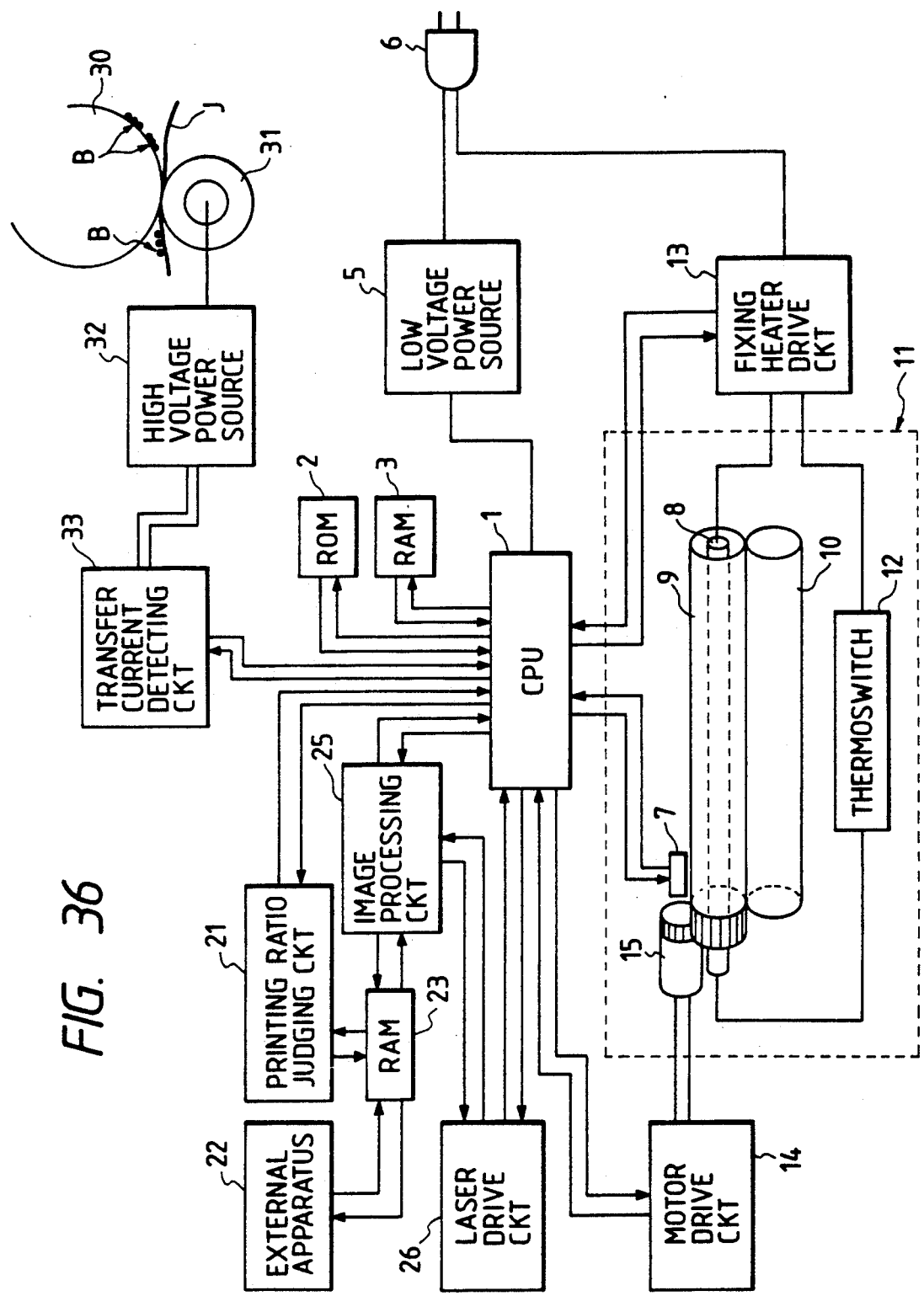
FIG. 36 is a block diagram showing the fourth embodiment of the present invention.
Figure 37:
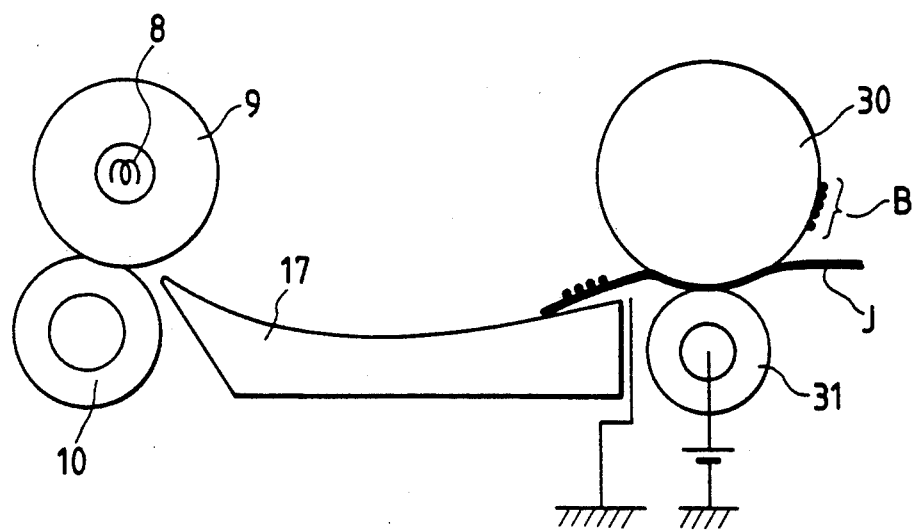
FIG. 37 is a sectional view showing the positional relationship between a photosensitive drum and a fixing device.
Figure 38A:
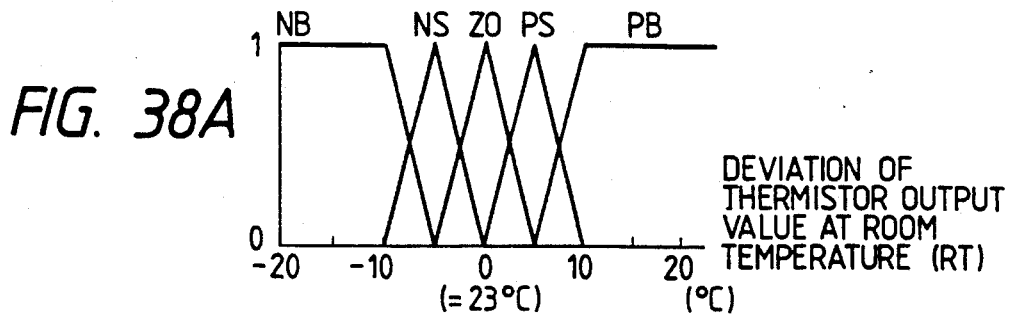
FIGS. 38A, 38B, 38C, and 38D are explanatory views showing fuzzy sets of the fourth embodiment.
Figure 38B:
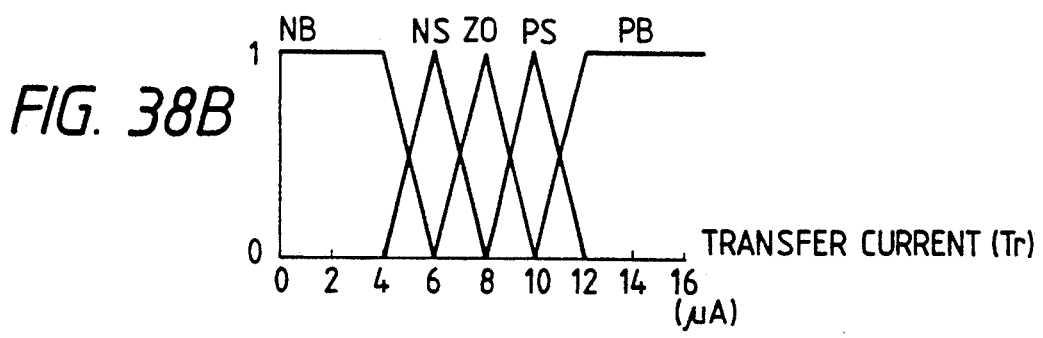
Figure 38C:
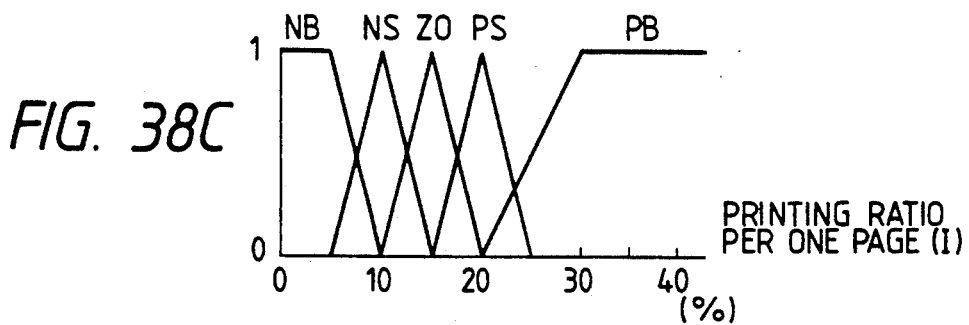
Figure 38D:
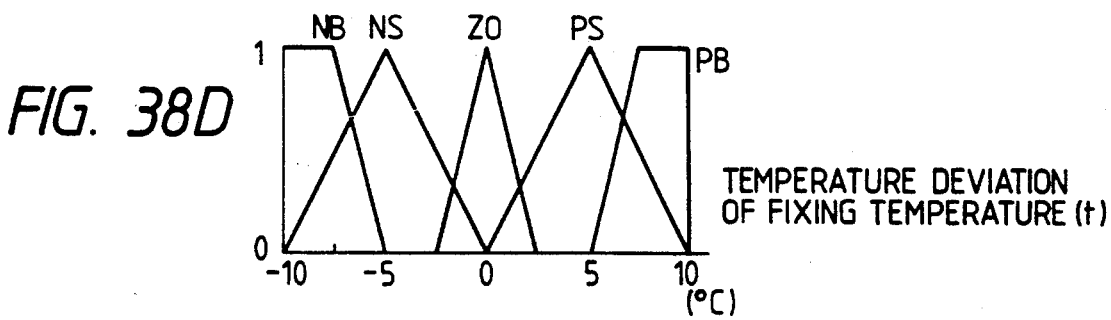

FIG. 36 is a block diagram showing the structure of a fixing device (fixing means) 11, its control circuit, and the like. In this embodiment, as a means for transferring a toner image B formed on a photosensitive drum 30 onto a transfer medium P, a transfer roller 31 (resistance=$1 \times 10^9$ $\Omega$) is used. The transfer roller 31 is rotatably supported by the copying apparatus main body, and is driven upon rotation of the photosensitive drum 30. The transfer roller 31 is connected to a high voltage power source 32, and is applied with a predetermined voltage (2 kV) when the transfer medium P is fed to a nip between the photosensitive drum 30 and the transfer roller 31. Furthermore, the high voltage power source 32 is connected to a transfer current detecting circuit 33. The transfer current detecting circuit 33 detects the magnitude of a current flowing through the transfer roller 31, and transmits the detection result to a CPU 1. Note that FIG. 37 shows the positional relationship between the photosensitive drum 30, the fixing device 11, and the like.

In fuzzy control of this embodiment, the current value detected by the transfer current detecting circuit 33 is used as one of condition variables. More specifically, the following three condition variables are used in the control of this embodiment:

① a deviation RT of a thermistor output value at room temperature when the power switch of the main body is turned on with respect to a preset ideal room temperature value (an output value of the thermistor; 23° C. in this embodiment as in the first embodiment);

② an average value Tr of a current per unit time (1 sec in this embodiment) when a transfer medium is inserted between the photosensitive drum 30 and the transfer drum 31; and ③ a printing ratio I per page of image data to be output.

Also, the following control variable is used in fixing temperature control:

④ a temperature deviation t with respect to the preset fixing temperature $T_{02}$.

FIGS. 38A, 38B, 38C, and 38D show fuzzy sets of the condition variables and control variable used in this embodiment.

In this embodiment, the resistance of the transfer medium can be calculated based on the current Tr flowing through the transfer roller 31. In addition, the basis weight of the transfer medium and an environment of the apparatus can be inferred from the resistance. For example, as Tr is smaller, the transfer medium has a higher resistance, and it can be inferred that the basis weight of the transfer medium is large or the main body apparatus is equipped in a low-temperature, low-humidity environment. As Tr is larger, the transfer medium has a lower resistance, and it can be inferred that the basis weight of the transfer medium is small or the main body apparatus is equipped in a high-temperature, high-humidity environment. More specifically, if Tr is NB or NS, it is highly probable that the basis weight of the transfer medium is large or the main body apparatus is equipped in a low-temperature, low-humidity environment. For this reason, the temperature deviation of the fixing temperature must be shifted to be relatively high.

FIG. 39 shows fuzzy rules used in this embodiment

Fuzzy control executed when the apparatus is equipped in a low-temperature environment at 5° C., and an image on B4-size thick paper (the basis weight is, e.g., 128 g/m$^2$) is to be fixed will be described below. Note that a solid-black image having a high printing ratio is formed on the thick paper.

The values of the condition variables for controlling the temperature deviation (t) of the fixing temperature are:

RT = −18° C., Tr = 2μ A, and I = 90%

Therefore, the following conditions are obtained:

RT = NB, Tr = NB, and I = PB

A fuzzy rule which influences the output of the temperature deviation (t) of the fixing temperature is:

IF RT is NB & Tr is NB & I is PB THEN t is PB

Figure 40:
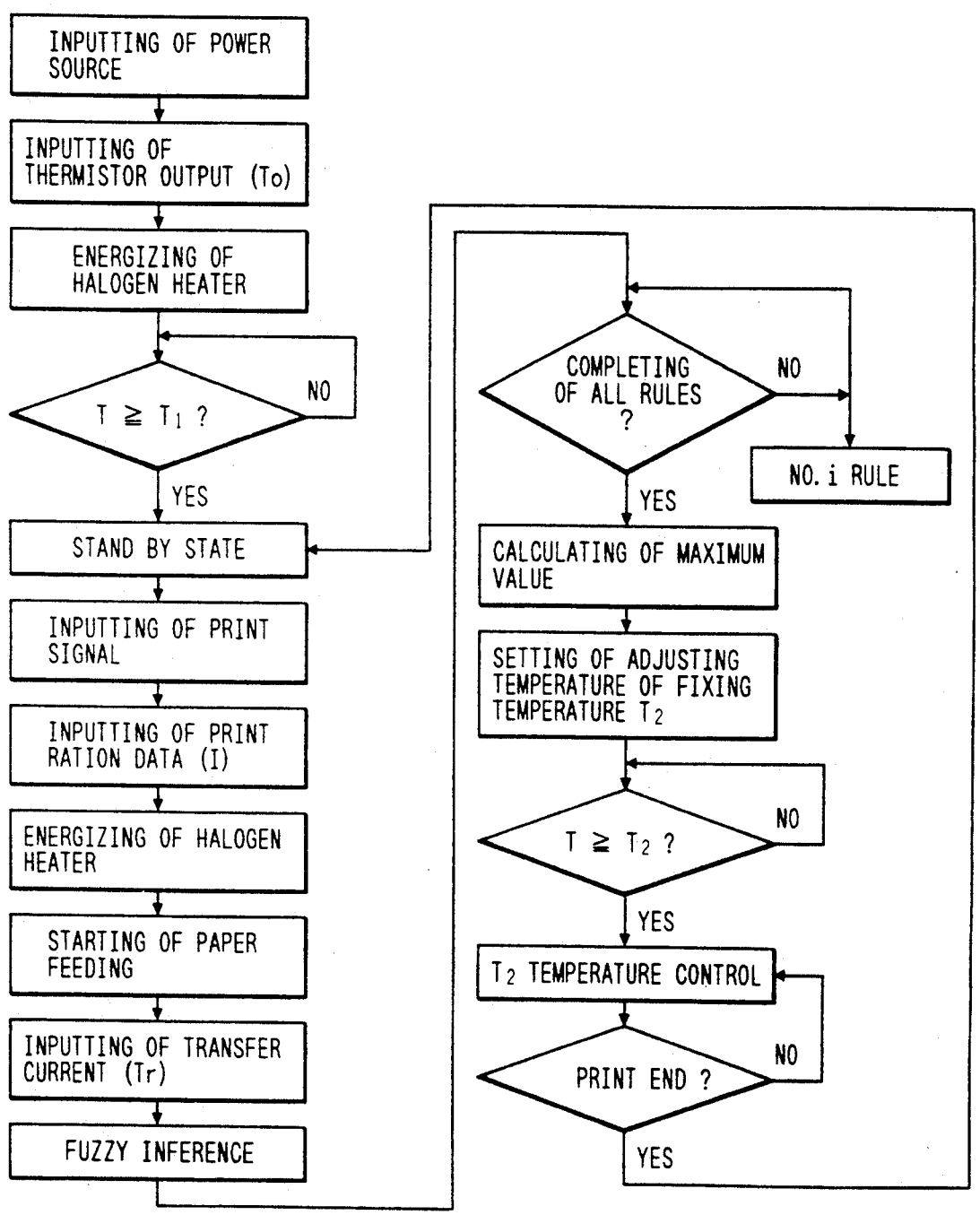
FIG. 40 is a flow chart showing fuzzy control in the fourth embodiment.

When fuzzy inference is executed according to the flow chart shown in FIG. 40, a control variable t = 8° C. can be obtained. From $T_2 = T_{02} + 8$, a setting value = 188° C. can be obtained as the fixing temperature $T_2$. More specifically, when a pattern having a high printing ratio is to be output onto thick paper having a large basis weight, the fixing temperature is shifted to be relatively higher than a normal temperature (initial setting value $T_{02}$). Thus, good fixing characteristics can be obtained.

A case will be described below wherein the apparatus is equipped in a high-temperature environment at 35° C., and an image on B4-size thin paper (the basis weight is, e.g., 64 g/m$^2$) is to be fixed. Note that a character image having a printing ratio of 5% is formed on the thin paper.

The values of the condition variables for controlling the temperature deviation (t) of the fixing temperature are:

RT = 12° C., Tr = 14 μA, and I = 5%

Therefore, the following conditions are obtained:

RT = PB, Tr = PB, and I = NB

A fuzzy rule which influences the output of the temperature deviation (t) of the fixing temperature is:

IF RT is PB & Tr is PB & I is NB THEN t is NB

When fuzzy inference is executed according to the flow chart shown in FIG. 40, a control variable t = −8° C. can be obtained. From $T_2 = T_{02} - 8$, a setting value = 172° C. can be obtained as the fixing temperature $T_2$. More specifically, when a pattern having a low printing ratio is output onto thin paper having a small basis weight in a high-temperature environment, the fixing temperature is shifted to be relatively lower than a normal temperature (initial setting value $T_{02}$). Thus, under a condition wherein sufficient fixing characteristics can be obtained, unnecessary heat energy is omitted, and energy can be saved. Furthermore, formation of paper wrinkles and curls can be avoided.

As described above, according to the present invention, since the fixing device can be stably controlled, power consumption can be suppressed regardless of, e.g., an input voltage drift, an environment of the apparatus main body, and the like, and an overshoot state can be prevented.

In addition, energy consumption can be minimized, and formation of paper curls and wrinkles can be avoided. Also, the temperature in the apparatus can be prevented from being unnecessarily increased.

The present invention has been described with reference to its embodiments. However, the present invention is not limited to these, and various changes and modifications may be made within the spirit and scope of the invention.

What is claimed is:

1. A fixing device comprising:
    a heating member for thermally fixing an image on a recording medium;
    condition variable detection means for detecting a condition variable, wherein said condition variable is a power source voltage value;
    inference means for fuzzy-inferring a control variable associated with energization to said heating member from the condition variable detected by said condition variable detection means; and
    control means for executing control associated with energization to said heating member using the control variable inferred by said inference means.

2. A device according to claim 1, wherein said control variable is a duty ratio of energization.

3. A device according to claim 1, further comprising a temperature detection member for detecting a temperature of said heating member, wherein said control means controls energization so that the temperature detected by said temperature detection member becomes a predetermined fixing temperature, and said control variable is a fixing temperature.

4. A device according to claim 1, wherein said condition variable detection means detects a plurality of different condition variables.

5. A device according to claim 4, wherein at least one of said condition variables is a room temperature value.

6. A device according to claim 4, further comprising a temperature detection member for detecting a temperature of said heating member, wherein at least one of said condition variables is a change amount of an output from said temperature detection member per unit time.

7. A device according to claim 4, further comprising a temperature detection member for detecting a temperature of said heating member, wherein at least one of said condition variables is an output value of said temperature detection member.

8. A device according to claim 4, wherein at least one of said condition variables is a size of the recording medium.

9. A device according to claim 4, wherein at least one of said condition variables is an image ratio on the recording medium.

* * * * *

UNITED STATES PATENT AND TRADEMARK OFFICE
CERTIFICATE OF CORRECTION

PATENT NO. : 5,311,268
DATED : May 10, 1994
INVENTOR(S) : YUKIHIRO OHZEKI, ET AL.

It is certified that error appears in the above-indentified patent and that said Letters Patent is hereby corrected as shown below:

Title page, insert --[30] Foreign Application Priority Data
      May 21, 1992 [JP] Japan.....4-156055--.

Column 1,
line 12, "device In" should read --device.  In--;
line 31, "a" should read --an--; and
line 42, "press" should read --fixing--, and "fixing" should read --press--.

Column 3,
line 56, "through" should read --though--.

Column 6,
line 45, "9a" should read --9 to a--; and
line 63, "fuzz" should read --fuzzy--.

Column 7,
line 29, "fizzy" should read --fuzzy--.

Column 9,
line 16, "S=23(=$Z_2$)." should read --23(=$Z_1$).--; and

UNITED STATES PATENT AND TRADEMARK OFFICE
CERTIFICATE OF CORRECTION

PATENT NO. : 5,311,268
DATED : May 10, 1994
INVENTOR(S) : YUKIHIRO OHZEKI, ET AL

It is certified that error appears in the above-indentified patent and that said Letters Patent is hereby corrected as shown below:

Column 9,
line 29, "$\mu z_1(-1)$" should read --$\mu z_1(=1)$--.

Signed and Sealed this

Twenty-second Day of November, 1994

Attest:

BRUCE LEHMAN

Attesting Officer

Commissioner of Patents and Trademarks